(12) United States Patent
Kuethe et al.

(10) Patent No.: US 7,247,330 B2
(45) Date of Patent: Jul. 24, 2007

(54) METHOD FOR CONTROLLING MICROBIAL CONTAMINATION OF A VACUUM-SEALED FOOD PRODUCT

(75) Inventors: David Forest Kuethe, Waunakee, WI (US); Vernon Donald Karman, Poynette, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 848 days.

(21) Appl. No.: 10/378,247

(22) Filed: Mar. 3, 2003

(65) Prior Publication Data

US 2004/0018284 A1    Jan. 29, 2004

Related U.S. Application Data

(63) Continuation-in-part of application No. 10/243,093, filed on Sep. 13, 2002, now Pat. No. 6,843,043, and a continuation-in-part of application No. 10/201,609, filed on Jul. 23, 2002, now abandoned.

(51) Int. Cl.
*B65B 55/14* (2006.01)
*B65B 55/18* (2006.01)
*B65B 31/02* (2006.01)

(52) U.S. Cl. .................. 426/325; 426/310; 426/326
(58) Field of Classification Search ................ 426/310, 426/324–326
See application file for complete search history.

(56) References Cited

U.S. PATENT DOCUMENTS

| | | | |
|---|---|---|---|
| 3,996,386 A * | 12/1976 | Malkki et al. ............... | 426/321 |
| 4,310,657 A | 1/1982 | Serres, Jr. | |
| 4,380,554 A | 4/1983 | Serres, Jr. | |
| 4,559,234 A | 12/1985 | Rubin et al. | |
| 4,810,508 A | 3/1989 | Dell'Acqua et al. | |
| 4,874,704 A | 10/1989 | Boudreaux et al. | |
| 4,883,673 A | 11/1989 | Gonzalez | |
| 4,929,445 A | 5/1990 | Vandenbergh et al. | |
| 5,015,487 A | 5/1991 | Collison et al. | |
| 5,043,174 A | 8/1991 | Lindner | |
| 5,043,176 A | 8/1991 | Bycroft et al. | |
| 5,064,576 A * | 11/1991 | Suto ............................ | 556/37 |
| 5,082,975 A | 1/1992 | Todd, Jr. et al. | |
| 5,085,873 A | 2/1992 | Degre | |
| 5,093,140 A * | 3/1992 | Watanabe .................... | 426/326 |
| 5,132,252 A | 7/1992 | Shiraiwa et al. | |

(Continued)

FOREIGN PATENT DOCUMENTS

EP    0466244    2/1991

(Continued)

OTHER PUBLICATIONS

Barnes et al., Morbidity and Mortality Weekly Report, vol. 38:267-268 (1989).

(Continued)

*Primary Examiner*—Steve Weinstein
(74) *Attorney, Agent, or Firm*—Fitch, Even, Tabin & Flannery

(57) ABSTRACT

Methods for controlling contamination of a food product are provided which utilize a combined treatment comprising thermal surface treatment and introduction of an antimicrobial solution to a food package prior to vacuum sealing the package.

32 Claims, 8 Drawing Sheets

U.S. PATENT DOCUMENTS

| | | |
|---|---|---|
| 5,170,611 A | 12/1992 | Buchko et al. |
| 5,186,962 A | 2/1993 | Hutkins et al. |
| 5,192,570 A | 3/1993 | Bender et al. |
| 5,205,110 A | 4/1993 | Buchko |
| 5,230,915 A | 7/1993 | Shahidi et al. |
| 5,268,185 A | 12/1993 | Bender et al. |
| 5,286,506 A | 2/1994 | Millis et al. |
| 5,425,956 A | 6/1995 | Shahidi et al. |
| 5,443,852 A | 8/1995 | Shahidi et al. |
| 5,451,369 A | 9/1995 | Daeschel et al. |
| 5,455,038 A | 10/1995 | Barney et al. |
| 5,458,876 A | 10/1995 | Monticello |
| 5,573,797 A | 11/1996 | Wilhoit |
| 5,573,800 A | 11/1996 | Wilhoit |
| 5,573,801 A | 11/1996 | Wilhoit |
| 5,576,035 A * | 11/1996 | Bowling et al. ............... 426/8 |
| 5,635,231 A * | 6/1997 | Bender et al. .............. 426/332 |
| 5,682,729 A | 11/1997 | Buchko |
| 5,976,005 A * | 11/1999 | Wilson et al. .............. 452/173 |
| 5,990,199 A * | 11/1999 | Bealing et al. ............. 523/161 |
| 6,010,726 A | 1/2000 | Evans et al. |
| 6,037,140 A | 3/2000 | Carles et al. |
| 6,039,992 A | 3/2000 | Compadre et al. |
| 6,054,163 A | 4/2000 | Wettenhall et al. |
| 6,110,509 A | 8/2000 | Nauth et al. |
| 6,113,954 A | 9/2000 | Nauth et al. |
| 6,136,351 A | 10/2000 | Nauth et al. |
| 6,149,952 A | 11/2000 | Horan |
| 6,150,139 A | 11/2000 | Mollet et al. |
| 6,242,017 B1 | 6/2001 | Nauth et al. |
| 6,287,617 B1 | 9/2001 | Bender et al. |
| 6,451,365 B1 * | 9/2002 | King et al. ................. 426/326 |
| 6,475,537 B1 * | 11/2002 | King et al. ................. 424/778 |
| 6,767,569 B1 * | 7/2004 | Marsden et al. ............ 426/326 |
| 6,927,237 B2 * | 8/2005 | Hei et al. .................... 514/557 |
| 6,976,347 B2 * | 12/2005 | Karman et al. ................ 53/428 |
| 6,991,820 B2 * | 1/2006 | Ming et al. .................. 426/310 |
| 2002/0064585 A1 * | 5/2002 | Christianson et al. ....... 426/326 |
| 2003/0215535 A1 * | 11/2003 | Wilson et al. .............. 424/778 |
| 2003/0228814 A1 * | 12/2003 | Barney et al. .............. 442/153 |

FOREIGN PATENT DOCUMENTS

| | | | |
|---|---|---|---|
| JP | 5-304936 | * | 11/1993 |
| JP | 2000-245417 | * | 9/2000 |
| JP | 2001-17138 | * | 1/2001 |
| WO | WO 98/10659 | * | 3/1998 |

OTHER PUBLICATIONS

Buchanan et al., Applied and Environmental Microbiology, vol. 55:599-603 (1989).
Bailey et al., Journal of Food Protection, vol. 52:148-150 (1989).
Gitter, The Veterinary Record, vol. 99:336 (1976).
Farber et al., Canadian Institute of Food Science Technology, vol. 21:430-434 (1988).
Jydegaard et al., Society for Applied Microbiology, vol. 31:68-72 (2000).
Motlagh et al., Journal of Food Protection, vol. 55:337-343 (1992).
Bhunia et al., Journal of Applied Bacteriology, vol. 70:25-33 (1991).
Ming et al., Journal of Food Science, vol. 62:413-415 (1997).
Fang et al., Journal of Food Protection, vol. 57:479-484 (1994).
Fowler et al., Society for Applied Bacteriology Technical Series, vol. 8:90-105 (1975).
Gailani et al., Journal of Food Protection, vol. 47:428-433 (1984).
Raccach, Journal of Food Safety, vol. 6:141-170 (1984).
Payne et al., Journal of Food Protection, vol. 52:151-153 (1989).

* cited by examiner

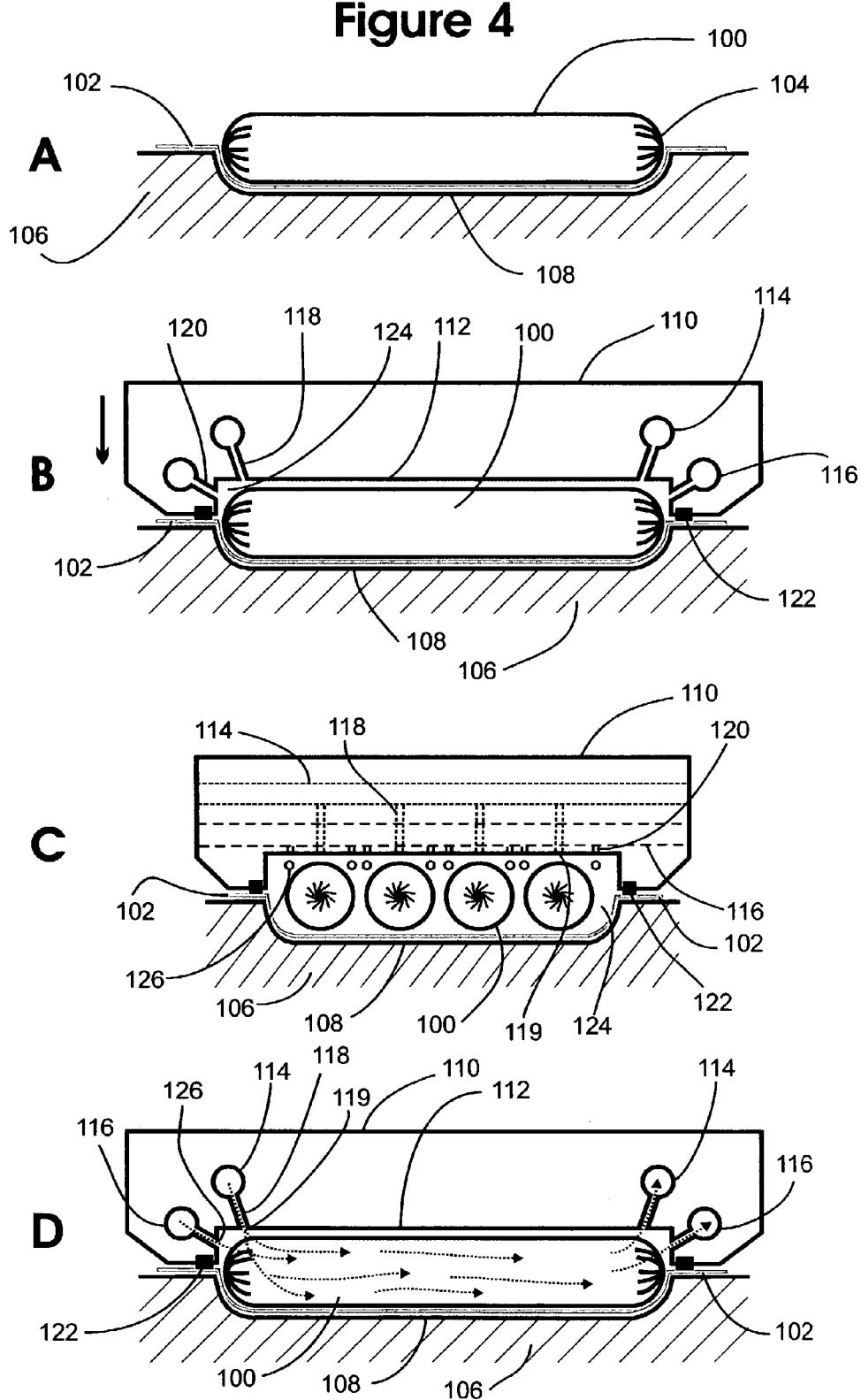

METHOD FOR CONTROLLING MICROBIAL CONTAMINATION OF A VACUUM-SEALED FOOD PRODUCT

RELATED APPLICATIONS

This application is a continuation-in-part of U.S. patent application Ser. No. 10/201,609, filed Jul. 23, 2002, now abandoned and of U.S. patent application Ser. No. 10/243,093, filed Sep. 13, 2002, now U.S. Pat No. 6,843,043, both of which are hereby incorporated by reference.

FIELD OF THE INVENTION

The invention relates to improved methods for controlling contamination of vacuum-sealed food products by a combined treatment comprising (1) a thermal surface treatment and (2) application of antimicrobial agents to the surface of food products, whereby the thermal surface treatment and the application of the antimicrobial solution are, in combination, effective for killing or inactivating essentially all pathogenic contamination in the vacuum-sealed food product.

BACKGROUND

The presence of food spoilage organisms and pathogens in foods is a major concern to the food processing industry, government regulatory agencies, and consumers. Elimination of pathogenic contamination has been the subject of a great deal of study in the food industry and in the scientific community. In particular, elimination of *Listeria monocytogenes* has been the focus of numerous studies and articles. See, e.g., Barnes et al., *Morbid. Mortal. Weekly Rep.* 38:267-268 (1989). Buchanan et al, *Appl. Environ. Microbiol.* 55:599-603 (1989); Bailey et al., *J. Food Prot.* 52:148-150 (1989); Gitter, *Vet. Res.* 99:336 (1976); and Farber et al., *Can. Inst. Food Sci. Technol. J.* 21:430-434 (1988).

Although food is generally inspected prior to packaging, it is presently not practical to inspect each package of food for complete application of an antimicrobial agent to the product. Incomplete or otherwise insufficient application reduces the efficacy of the antimicrobial.

U.S. Pat. Nos. 5,573,800 and 5,573,801 provide an antimicrobial solution that includes nisin and/or pediocin along with a chelator, and processes for using the antimicrobial solution to treat the surface of foods by applying the composition to the entire surface of the food. In certain embodiments, the antimicrobial solution is contained on packaging films which are applied to foods. The antimicrobial solution is deposited on the surface by spraying, dipping, mixing, or by impregnating or coating the antimicrobial agent onto a food casing.

U.S. Pat. No. 5,085,873 provides a process for the treatment of a hydrated food product by depositing an antimicrobial mixture containing lactoperoxidase, a thiocyanate, and an oxygen donor on the surface of the hydrated food product. The antimicrobial mixture is deposited on the surface by pulverizing, immersion in a bath, or through the use of an antimicrobial agent-containing packaging.

U.S. Pat. No. 6,149,952 discloses a method for determining the presence of contaminating bacteria in a packaged food by using a permeable hydrophilic polymeric composition containing an indicator to line a package. The indicator is capable of detecting gases originating from contaminating bacteria.

Web packaging apparatus and methods using such web packaging apparatuses are well known in the food industry. U.S. Pat. Nos. 5,170,611, 5,205,110, and 5,682,729, for example, provide packaging machines for packaging food products between upper and lower webs of suitable packaging films. Generally, such packaging machines include a web transport conveyor for transporting the lower web through a series of stations, including a forming station whereby the lower web is converted into a portion of a food package, a loading station whereby the food product is loaded into the formed portion of the food package, and a closing station whereby the upper web and the formed portion of the food package containing the food product are combined to provide the packaged food product.

There remains a need for more efficient, more effective, and simplified methods for treating the surface of a food product to kill and/or significantly reduce the growth of foodborne pathogens without subjecting the food product to high temperatures for relatively long periods of time. Furthermore, there remains a need for methods to assure that an antimicrobial surface treatment is effective for essentially eliminating foodborne pathogens. The current invention provides an efficient, effective, and simplified method for controlling contamination of a food product. Furthermore, the current invention provides a simple yet surprisingly effective method for treating the surface of a food product to kill and/or significantly reduce the growth of foodborne pathogens without subjecting the food product to high temperatures for relatively long periods of time.

SUMMARY OF THE INVENTION

The present invention provides improved methods for controlling contamination of vacuum-sealed food products by a combined treatment comprising (1) a thermal surface treatment and (2) application of one or more antimicrobial agents to the surface of food products, whereby the thermal surface treatment and the application of the antimicrobial solution are, in combination, effective for killing or inactivating essentially all pathogenic contamination in the vacuum-sealed food product. The present methods can easily be incorporated into a vacuum packaging line such as a web packaging system wherein the food product is packaged and sealed between upper and lower webs.

The present invention provides methods utilizing thermal surface treatment and application of an antimicrobial agent. Preferably, the combined treatment comprises thermal surface treatment as a first treatment step followed immediately by the application of the one or more antimicrobial agents as a second treatment step. Preferably, the present methods are incorporated into a web packaging system comprising a series of stations whereby a lower web is formed into a partial package at a forming station, the food product is loaded into the partially formed package at a loading station, and the food product is sealed in a final package using the upper web at a closing station. Preferably, the thermal surface treatment and application of the antimicrobial agent are carried out between the loading station and the closing station. Even more preferably, the present invention provides a method comprising, in order, forming a lower web into a partial package at a forming station, loading the food product into the partially formed package at a loading station, thermal treatment of the surfaces of the food product in the partially formed package at a thermal surface treatment station, treatment of the surfaces of the food product with an antimicrobial agent at an antimicrobial station, and sealing the treated food product in a closing station by forming a final package from the partially formed package and an upper web employing a vacuum and/or heat sealing operation. In an especially preferred embodiment, the combined steam surface treatment and antimicrobial treatment method of the present invention can be incorporated into the web packaging system described in U.S. patent application Ser. No. 10/243,093, filed Sep. 13, 2002.

In an especially preferred embodiment wherein the thermal surface treatment step is followed immediately by the antimicrobial agent step, the thermal surface treatment provides the initial pathogen kill while the antimicrobial agent application step provides additional pathogen killing power directed to microbes which may have only been injured or weakened by the initial thermal surface treatment step. Additionally, the antimicrobial agent provides effective bacteriostatic protection within the sealed package which helps increase the shelf life of the packaged food product. Moreover, surface tension and/or capillary action created during the vacuum and/or heat sealing process helps to efficiently create a uniform distribution of antimicrobial solution over the surface of a food. This method insures rapid and effective coating of the product with the antimicrobial agent. The uniform distribution of antimicrobial solution on the food product is generally in the form of a surface layer and provides a highly concentrated agent to kill any pathogens that may have survived the thermal surface treatment step (including pathogens weakened by the thermal surface treatment step and pathogens on surface sites which were missed by, or received inadequate treatment from, the thermal surface treatment step). This method is especially adapted for packaging wieners or similar type processed meat food products.

The present invention provides a method for controlling pathogenic contamination in a vacuum-sealed food product, said method comprising:

(1) providing a food product with a food surface;

(2) providing a flexible vacuum-sealable package having a package cavity for holding the food product;

(3) placing the food product into the package cavity;

(4) treating the food product for a time and temperature effective for thermal surface treatment;

(5) introducing an effective amount of an antimicrobial solution containing an antimicrobial agent into the package cavity; and (6) vacuum sealing the food product in the package such that the package cavity and the package shrinks around the food product and the antimicrobial solution is uniformity dispersed over the food surface, whereby the thermal surface treatment and the antimicrobial solution are effective for killing or inactivating essentially all pathogenic contamination in the vacuum-sealed food product.

In preferred embodiments, the food product is a processed meat (e.g., wieners or sliced meat products such as bologna, ham, turkey, and the like); in especially preferred embodiments, the food product is one or more wieners. In preferred examples of embodiments involving about 4 to 10 wieners, the thermal surface treatment is effected with steam and the antimicrobial treatment is effected by introducing about 0.25 to about 10 $cm^3$ of the antimicrobial solution into the package cavity; preferably the total free liquid in the package (defined as the sum of added antimicrobial solution plus surface water on the food product) is no more than about 10 $cm^3$. By removing condensed steam (and, thus, effectively at least partially drying the food surfaces) prior to packaging, more antimicrobial solution can, if desired, be used without adversely affecting vacuum sealing properties or increasing sealing failure rates. Once the food product is vacuum sealed, the antimicrobial solution is uniformly dispersed over the surface pasteurized food surfaces and, in combination with the thermal surface treatment, provides the desired protection.

The antimicrobial solution used in the methods of the current invention contains one or more antimicrobial agents that can include any effective food-grade antimicrobial compound. Suitable agents are believed to include, but are not limited to, antibacterial agents (also referred to as bactericidal agents) which are effective to kill or inhibit bacteria (e.g., antibiotics such as nisin, nisin-containing whey, natamycin, subtilin) or *Pediococcus*-derived bacteriocins (e.g., pediocin); food-grade acids and salts of food-grade acids (e.g., acetic acid, lactic acid, malic acid, phosphoric acid, sorbic acid, benzoic acid, mixtures thereof, and the like); heat resistant antibacterial enzymes such as lysozyme; spice extracts having antibacterial properties; plant extracts having antibacterial properties (e.g., hop extracts; rosemary extracts, rosemary extract acids such as rosmarinic acid and carnosic acid); inorganic salts having antibacterial properties (e.g., acidified calcium sulfate); and other agents such as liquid smoke, parabens, or ozone; mixtures of such agents can also be used. In certain preferred embodiments, the antimicrobial agent is selected from food-grade acids and their salts, bacteriocins, spice extracts, plant extracts, nisin, hops acid extracts, tertiary butylhydroquinone, cetyl pyridium chloride, and mixtures thereof. For purposes of this invention, an "effective amount" of the antimicrobial solution or antimicrobial agent is an amount sufficient, in combination with the thermal surface treatment, to control and/or prevent microbial growth for at least about 4 months under refrigerated storage conditions. An especially preferred antimicrobial agent is hops acid extract.

Another aspect of the current invention encompasses drying the surface of the food product (i.e., removing excess surface water or moisture) before contacting the surface with the antimicrobial solution. In a preferred embodiment, the surface of the food product is dried to remove at least a portion (generally at least 50 percent, more preferably at least about 75 percent, and most preferably about 80 to about 90 percent) of the excess water (especially condensed water when steam is used in the thermal surface treatment step). Such drying may be effected using, for example, vacuum, suction, pressurized sterile air or inert gas to create high pressure gas flow across the surface of the food product, or the like. The antimicrobial solution can be introduced into the package cavity before the food product is placed in the package cavity, at the same time as the food product is placed in the package cavity, or after the food product is placed in the food cavity. Alternatively, the antimicrobial solution can be introduced into the package cavity in multiple portions. For example, a portion of the antimicrobial solution could be added via the surface of the food product (i.e., at the same time as the food product) followed by a second portion added after the food product has been placed in the food cavity. In another example specifically adapted for packaging wieners, a portion of the antimicrobial solution can be sprayed onto the ends of the wieners (i.e., areas having non-uniform surfaces ("wrinkles") and, thus, most likely to harbor bacteria and/or microbes). Other addition sequences using multiple portions of the antimicrobial solution can be used if desired. Generally, however, it is preferred that the antimicrobial solution is only added after the thermal surface treatment step and even more preferably after removal of any excess water that may result from the thermal surface treatment step.

Embodiments of the current invention wherein the food surface is dried prior to being introduced into the food cavity offer several advantages. For example, if the antimicrobial solution is applied to the food surface by dipping in an antimicrobial solution and/or by spraying with the antimicrobial solution, the applied dose can be controlled using liquid viscosity (liquid layer thickness) and concentration. Additionally, such an optional surface drying step and controlled addition of the antimicrobial solution allows better control of the heat seal area; keeping excess liquid away from the heat seal area allows better vacuum sealing and reduced seal failure. Additionally, the antimicrobial solution will not be significantly diluted by water on the surface of the food product. Thus, increased pathogen kill and/or protection can be expected. For example, standard wieners (about 0.1 lb each), without pre-drying, would normally have up to about 0.3 to about 1.2 $cm^3$ surface water/wiener before packaging which, of course, would significantly dilute the antimicrobial solution. By removing at least a significant portion (generally at least 50 percent and more preferably at least about 75 percent) of this water prior to introducing the antimicrobial solution, higher levels of the antimicrobial agent can be achieved without adversely affecting the sealing process. Using such a drying step also allows excess antimicrobial solution to be recycled since it is not diluted with surface water. Thus, for example, pre-dried wieners could be dipped into antimicrobial solution; any the excess dripping off could be collected and reused without diluting the antimicrobial solution.

In another aspect, the current invention encompasses heating the surface of the food product (preferably after removing excess surface water or moisture from the surface) before contacting the surface with the antimicrobial solution. Generally, it is preferred that the surface of the food product is heated to about 150 to about 250° F. just prior to adding the antimicrobial solution. Alternatively, the antimicrobial solution could be heated to about 120 to about 180° F. prior to contacting the surface of the food product. Such heating (of either the food surface directly or via a heated antimicrobial solution) will modify the surface tension and/or viscosity of the antimicrobial solution and thereby provided significantly better coverage, diffusion rates, and microbe kill.

In an especially preferred embodiment, the food surface is heated sufficiently to affect thermal surface treatment prior to the addition of the antimicrobial solution. By using both the thermal surface treatment step and the antimicrobial application step, better kill rates can be achieved than using either step alone. Indeed, essentially complete kill rates can be achieved using the combined treatment even if the duration of the thermal surface treatment step is significantly reduced and/or if the amount of antimicrobial solution is significantly reduced. By reducing the duration of the thermal surface treatment step, significantly higher throughputs can be achieved without sacrificing kill rates and without long exposure of the food product to elevated temperatures. Reducing the duration of the thermal treatment, especially in cases where the food product is chilled prior to the thermal surface treatment, reduces the need to quickly chill the food product after the thermal surface treatment and antimicrobial treatment. Moreover, reduced volumes of antimicrobial solution can be used without reducing the effectiveness of the combination treatment.

In another aspect, the current invention provides improved antimicrobial solutions containing both antimicrobial agents and marking agents, and methods using these improved antimicrobial solutions for monitoring coverage of a food product surface by the antimicrobial agent. In certain aspects, the antimicrobial agents are bactericidal agents.

In this aspect, the present invention provides a method for controlling contamination in a vacuum-sealed food product, said method comprising:

(1) providing a food product with a food surface;

(2) providing a flexible vacuum-sealable package having a package cavity for holding the food product;

(3) placing the food product into the package cavity;

(4) treating the food product for a time and temperature effective for thermal surface treatment;

(5) introducing an effective amount of an antimicrobial solution containing an antimicrobial agent into the package cavity;

(6) introducing a detectable marking agent into the package cavity;

(7) vacuum sealing the food product in the package such that the package cavity and the package shrinks around the food product and the antimicrobial solution and marking agent are uniformity dispersed over the food surface; and (8) detecting the marking agent to assess proper introduction and dispersion of the antimicrobial agent throughout the package cavity, whereby the thermal surface treatment and the antimicrobial solution are effective for killing or inactivating essentially all pathogenic contamination in the vacuum-sealed food product. Preferably the marking agent is included in the antimicrobial solution along with the antimicrobial agent. Preferably the marking agent allows the manufacturer to easily confirm substantially complete coverage of the food surfaces by the marking agent and, by implication, the antimicrobial agent. This method is especially adapted for packaging processed meats (e.g., wieners and meat products such as bologna, ham, turkey, and the like).

In preferred embodiments, the marking agent is selected from a food-grade wetting agent, a food-grade color, a food-grade dye, a food-grade luminescent compound, a food-grade fluorescent compound, a food-grade odor-producing compound, as well as food-grade activators and suppressors of any of the aforementioned marking agents. In a preferred embodiment, the marking agent is a water soluble, food-grade dye that is compatible with the color of the food (i.e., can be easily seen to assess coverage) but then diffuses into the food without affecting the color of the food in a visually noticeable way after it diffuses into the food. In another preferred embodiment, a supersaturated aqueous solution or a non-aqueous soluble marker can be used as the marking agent. In such a system, the marking agent can initially form an opaque solution due to the formation of small crystals; over time, the solution will clear.

In certain preferred embodiments, the detectable antimicrobial compounds of the current invention are combined with the methods described above for controlling contamination of a vacuum-sealed food product and/or controlling contamination by using a drying step. For these embodiments, the method further comprises detecting the marking, agent.

The current invention also includes two-step methods using the detectable antimicrobial solutions, which include a marking agent, and a separate marking partner associated with the food or the food surface thereof. In the two-step methods, the marking partner gives the food a characteristic that is unusual for the food. In these embodiments, the marking agent then changes the characteristic in a detectable manner. For example, the marking partner may be a food dye that provides a food an unusual color that is reversed when the food is exposed to a marking agent. By using this method, a process may be monitored to assure that the surface of a food is substantially completely covered by an antimicrobial agent. The marking partner may be any class of food-grade compounds, as described above, that are appropriate for the marking agent.

DESCRIPTION OF THE PREFERRED EMBODIMENTS

Figure 1:
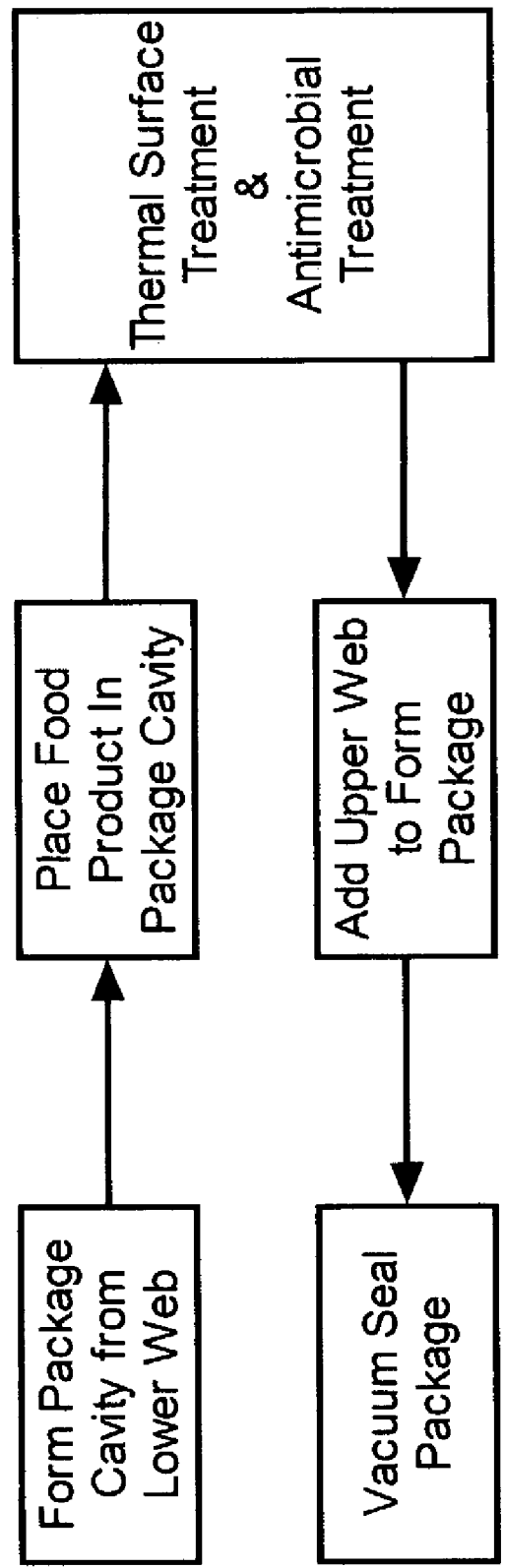
FIG. 1 provides a general flowchart of the present invention.

This invention provides a method for controlling contamination of a vacuum-sealed food product. A food with a food surface and a heat-sealable package having a package cavity for holding the food are provided. The surfaces of the food is treated with both a thermal surface treatment and an antimicrobial solution, preferably within the package cavity. Preferably, the food surfaces are first exposed to a thermal surface treatment and then the antimicrobial treatment. More preferably, the thermal surface treatment and antimicrobial treatments are incorporated into a web packaging system line. It is not necessary that the entire exterior surface of the food product is covered with the antimicrobial solution. The package is then vacuum sealed over the food and the vacuum-sealed food product is then stored under conditions that allow the antimicrobial solution to cover the surface of the food, thus forming the vacuum-sealed food product. The general process of the present invention as incorporated into a web packaging system is illustrated in FIG. 1. In a first step, a package cavity for hold the food product is formed using conventional techniques from the lower web film material. The food product to be treated is then placed into the package cavity. The food product is subjected to a thermal surface treatment and an antimicrobial treatment. The thermal surface treatment can be carried out before, essentially at the same time, or after the antimicrobial treatment. Preferably, the thermal surface treatment is first, followed immediately (i.e., within a few seconds) by the antimicrobial treatment. Generally, thermal surface treatment is carried out by exposing the surface of the food product to steam for a short time period (generally less than about 2 seconds). In another preferred embodiment, the thermal surface treatment step also includes, or is immediately followed by, a step to remove water that may have condensed on the food surfaces followed by application of an effective amount of an antimicrobial solution to the surface of the food product and/or into the package cavity. After adding the upper web film material, the package containing the treated food product is then vacuum sealed. During vacuum sealing, the package shrinks around the food product and the antimicrobial solution is uniformity dispersed over the food surfaces. The combination of thermal surface treatment and antimicrobial treatment are effective for killing or inactivating essentially all pathogenic contamination in the vacuum-sealed product.

Figure 2:
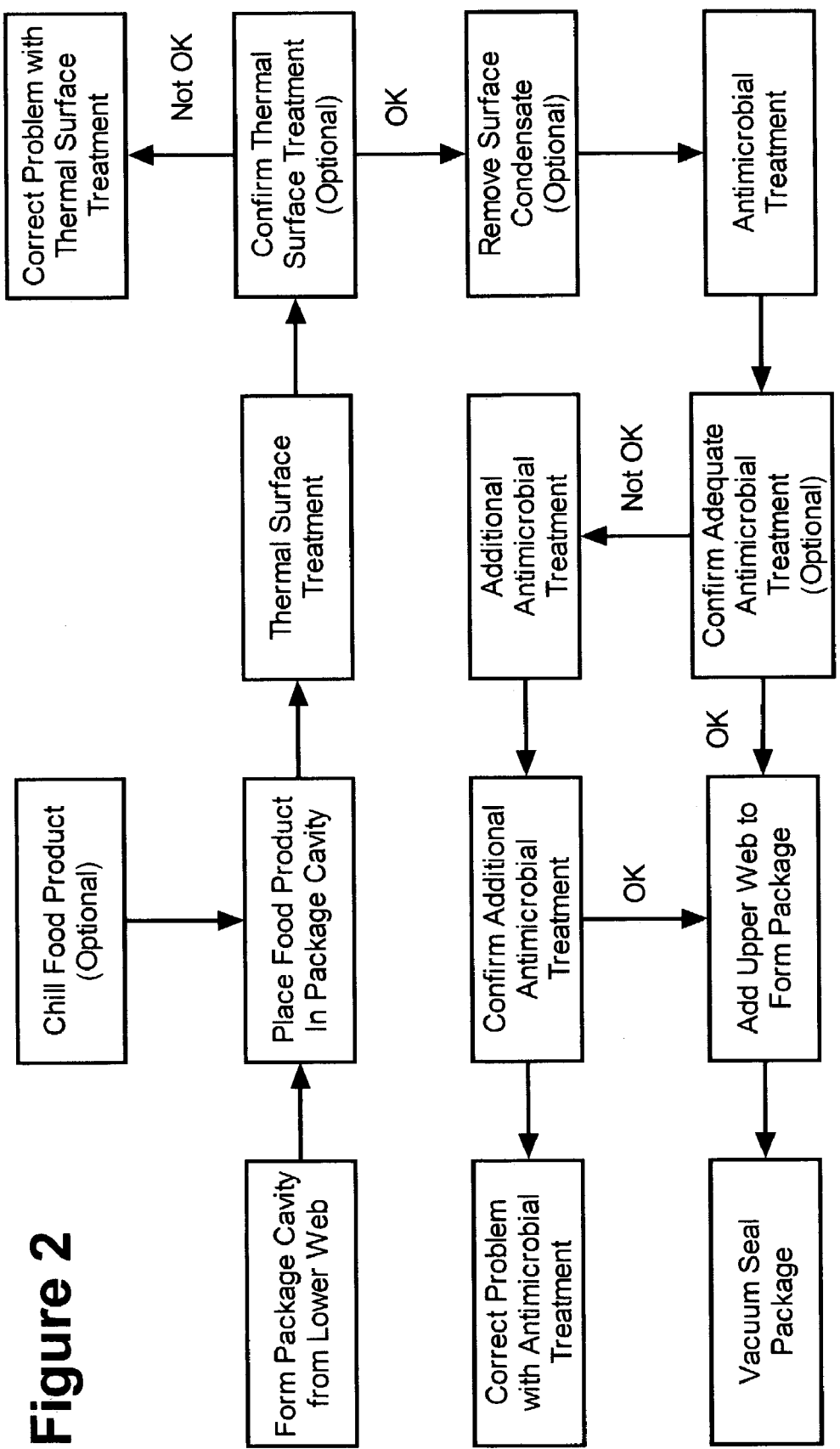
FIG. 2 provides a flowchart of a preferred embodiment of the present invention.

FIG. 2 illustrates an especially preferred embodiment wherein the thermal surface treatment is conducted first and the antimicrobial treatment is conducted second. FIG. 2 also illustrates several optional steps or features of the present invention. In a first step, a package cavity for holding the food product is formed using conventional techniques from the lower web film material. The food product to be treated is then placed into the package cavity. The food product may be optionally chilled (i.e., cooled below ambient temperatures and preferably at least partially frozen) before being placed in the food cavity. This optional chilling step helps to prevent the overall temperature of the food product, after exposure to the thermal surface treatment, from rising to an unacceptable level and/or reduce the need for a chilling step after the thermal surface treatment. The food product is subjected to a thermal surface treatment. Generally, thermal surface treatment is effected by exposing the surface of the food product to steam for a short time period (generally less than about 2 seconds). An optional step can be incorporated into the process whereby the adequacy of the thermal surface treatment is confirmed. For example, the surface temperature can be determined using a non-contact infrared (IR) temperature sensing device at one or more surface locations immediately after the food product has exited the thermal surface treatment station. If the surface temperature has not risen a significant amount (for example, more than about 100° F. or more preferably more than about 140° F.) relative to the temperature before the thermal surface treatment station, the process should be interrupted until the problem with the thermal surface treatment can be corrected. If, however, the adequacy of the thermal surface treatment is confirmed, the process can continue.

Optionally, at least a portion of the surface condensate (assuming the thermal surface treatment was affected using steam) can be removed using, for example, a vacuum or suction and/or a stream of gas (e.g., sanitary air) across the surface of the food product. If used, it is not necessary to remove all condensate; generally removal of about 80 to about 90 percent is preferred although lesser or greater amounts can be removed, if desired. Following the thermal surface treatment, and any optional steps that might be employed, the food product is treated with the antimicrobial treatment; preferably, the antimicrobial treatment is carried out within about 10 seconds or less of the thermal surface treatment. As shown in FIG. 2, an optional step to confirm that sufficient antimicrobial solution has been added can be used. Such a step or sensor might, for example, measure the total flow of the applied antimicrobial solution and compare that value to a predetermined value based on the amount of food product being treated and the desired amount of antimicrobial solution desired to be added. If sufficient antimicrobial solution has been applied, the upper web can be applied to form the package and the package then vacuum sealed. If sufficient antimicrobial solution has not been added, a separate or additional antimicrobial application station can be activated to apply additional antimicrobial solution. Thus, for example, two set of nozzles in series can be incorporated into the line to apply antimicrobial solution with the sensor mounted in between the two sets of nozzles. Only if the sensor determines that the first set of nozzles did not apply sufficient antimicrobial solution would the second set of nozzles be activated. The second sensor could be used to determine if the second set of nozzles corrected the problem. If both set of nozzles malfunction, the line should be shut down until the problem is corrected.

After adding the upper web film material, the package containing the treated food product is then vacuum sealed. During vacuum sealing, the package shrinks around the food product and the antimicrobial solution is uniformity dispersed over the food surfaces. The combination of thermal surface treatment and antimicrobial treatment are effective for killing or inactivating essentially all pathogenic contamination in the vacuum-sealed product.

Preferably, the overall time from the beginning of the thermal surface treatment to the completion of the vacuum sealing of the package (see FIGS. 1 and 2) takes less than about 15 seconds, more preferably less than about 10 seconds, and even more preferably about 6 to about 10 seconds. Preferably, the thermal surface treatment takes about 1 to 2 seconds, the removal of surface condensate (an optional but preferred step) takes about 1 to about 2 seconds, the application of the antimicrobial solution takes about 1 to about 2 seconds, and the addition of the upper web and the actual vacuum sealing of the package takes less than about 2 seconds. Preferably, the antimicrobial treatment follows within less than about 3 seconds after the completion of the thermal surface treatment. Preferably, the package is vacuum sealed within less than about 3 seconds after the completion of the antimicrobial treatment.

The combination of the thermal surface treatment and the antimicrobial solution treatment should be conducted in a manner sufficient to kill or inactivate essentially all pathogenic contamination in the vacuum-sealed food product. For purposes of this invention, "killing or inactivating essentially all pathogenic contamination" is intended to mean at least a 4 log kill of *Listeria* organisms based on United States Department of Agriculture tests as provided in Microbiology Laboratory Guidebook, USDA, $3^{rd}$ Ed., Chapter 8, Revision 3 (1998). It is the combination of thermal surface treatment and antimicrobial treatment which is important in the present invention. As those skilled in the art will realize, decreased thermal energy supplied during the thermal surface treatment can be compensated for by increasing the effectiveness of the antimicrobial treatment phase (for example, by increasing the concentration of the active antimicrobial agent, the total amount of antimicrobial solution added, and/or increasing the temperature of the antimicrobial treatment). Likewise, increasing the thermal energy supplied during the thermal surface treatment can allow reduction in the antimicrobial treatment phase.

Preferably it is preferred to use steam at a pressure of about 10 to 50 psi, more preferably at about 15 to about 25 psi in the thermal surface treatment. It is even more preferred to use short duration multiple bursts of such steam. Typically, 1 to 10 steam bursts of about 0.1 to 0.5 seconds duration each are used; preferably, about 2 to 6 steam bursts of 0.2 to 0.3 seconds duration each are used. For food products like wieners, it is generally preferred that the direction of the steam bursts be along the long axis of the wieners and that the direction of the steam bursts be reversed for each steam burst. It is difficult to measure the increase in surface temperature during the thermal surface treatment. Nonetheless, it is estimated that the surface temperature of wieners rapidly (i.e., within 1 to 2 seconds) increases to a temperature of about 200° F. or higher when steam is used to affect the thermal surface treatment. Moreover, it is estimated that the total amount of thermal energy supplied to the surface of wieners using the present invention is sufficient, if the wieners are maintained in insulated enclosure until thermal equilibrium is achieve, to raise the equilibrium temperature of the wieners by about 10 to about 30° F. Nonetheless, as noted earlier, the effectiveness of the present invention is to be measured by the ability of the combined thermal surface and antimicrobial treatments to kill or inactivate essentially all pathogenic contamination in the vacuum-sealed food product.

Figure 3:
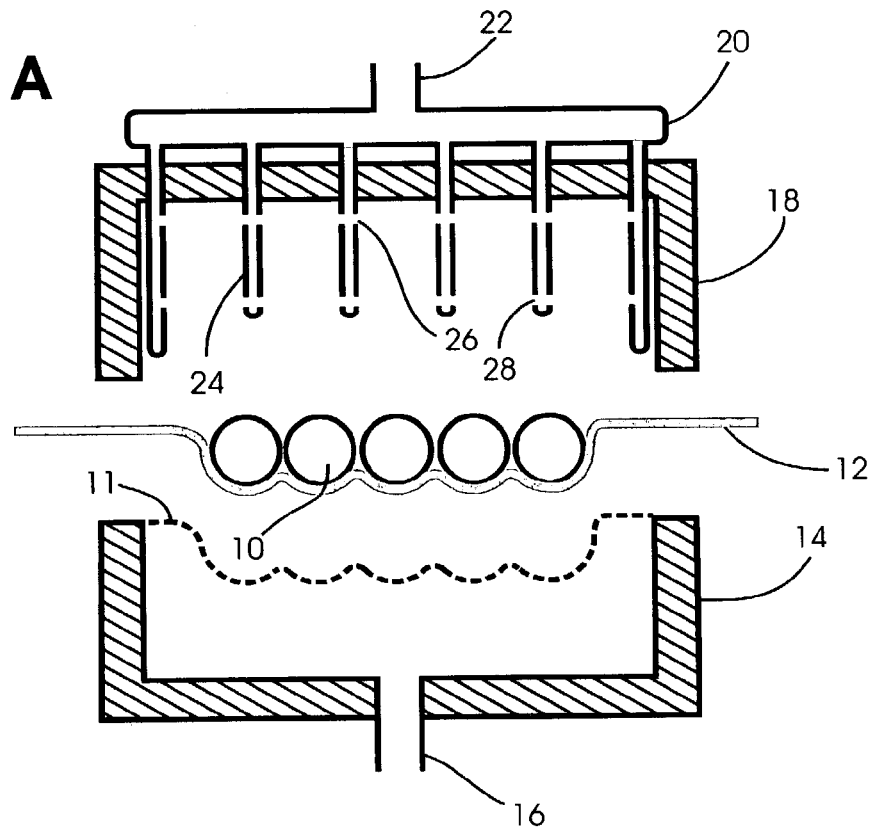
FIG. 3 illustrates one embodiment wherein the thermal surface treatment and antimicrobial application are carried out in the same treatment chamber. Panel A illustrates step 1 (begin cycle by indexing wieners into the treatment chamber); Panel B illustrates step 2 (closing of treatment chamber); Panel C illustrates step 3 (evacuation of the treatment chamber with lifting and separation of the individual wieners); Panel D illustrates step 4 (thermal surface treatment using steam); Panel E illustrates step 5 (dropping wieners); Panel F illustrates step 6 (drying the surface of the wieners); Panel G illustrates step 7 (application of antimicrobial composition); and Panel H illustrates step 8 (end cycle by opening treatment chamber so that the treated wieners can proceed to the packaging station and the next subset of wieners can be indexed into the treatment chamber to begin the next cycle).
Figure 3:
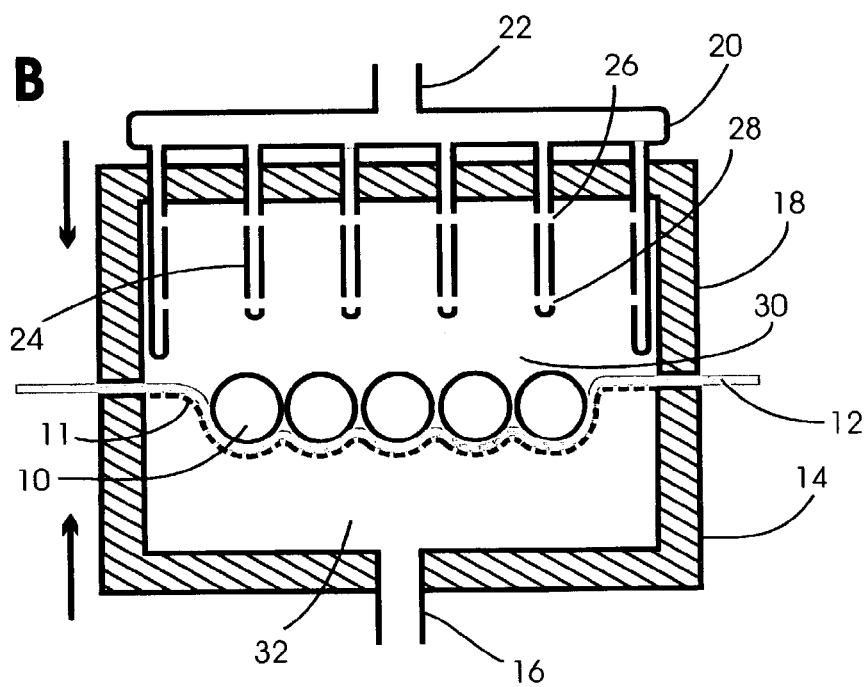
Figure 3:
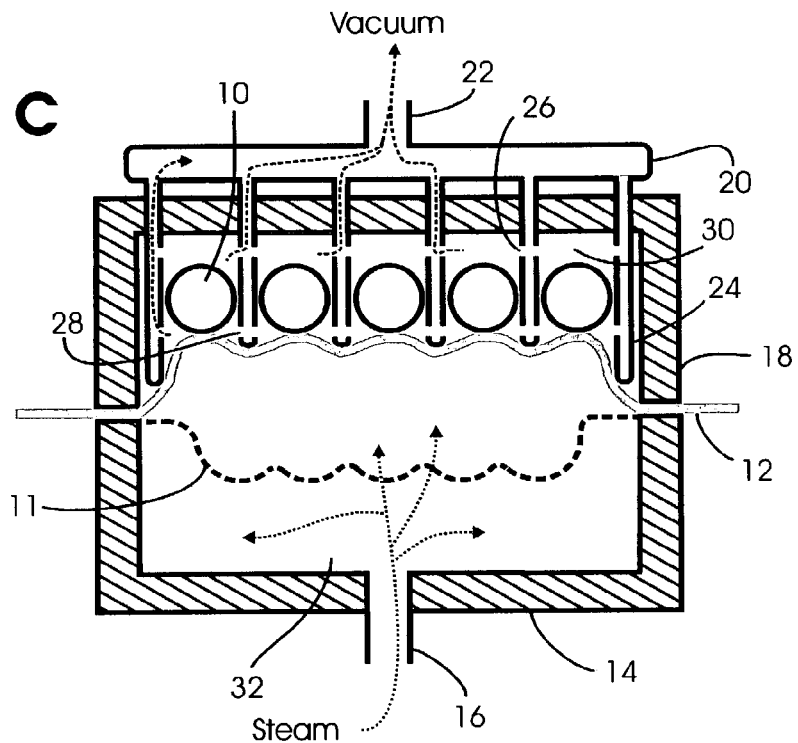
Figure 3:
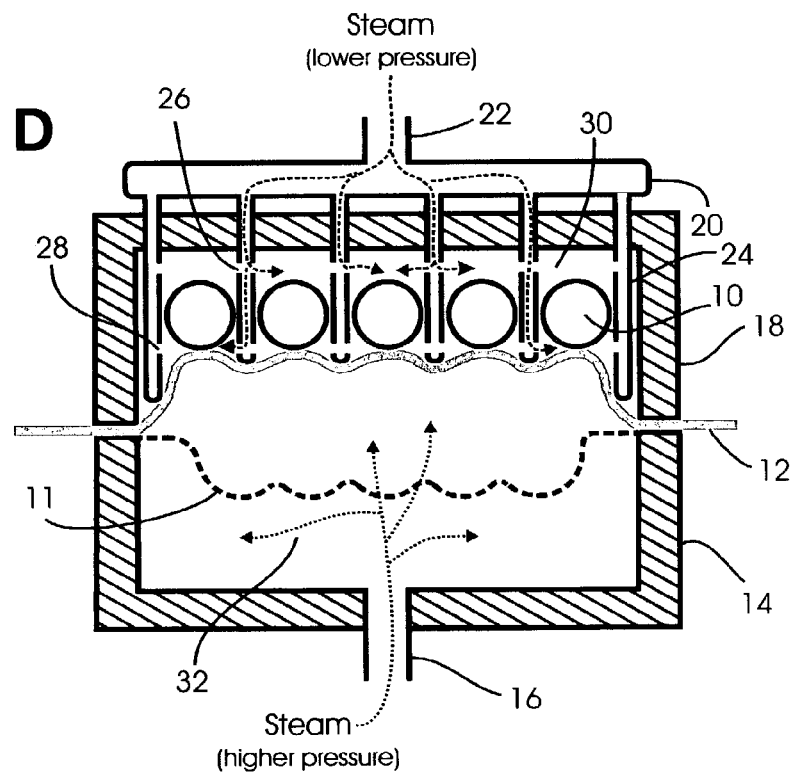
Figure 3:
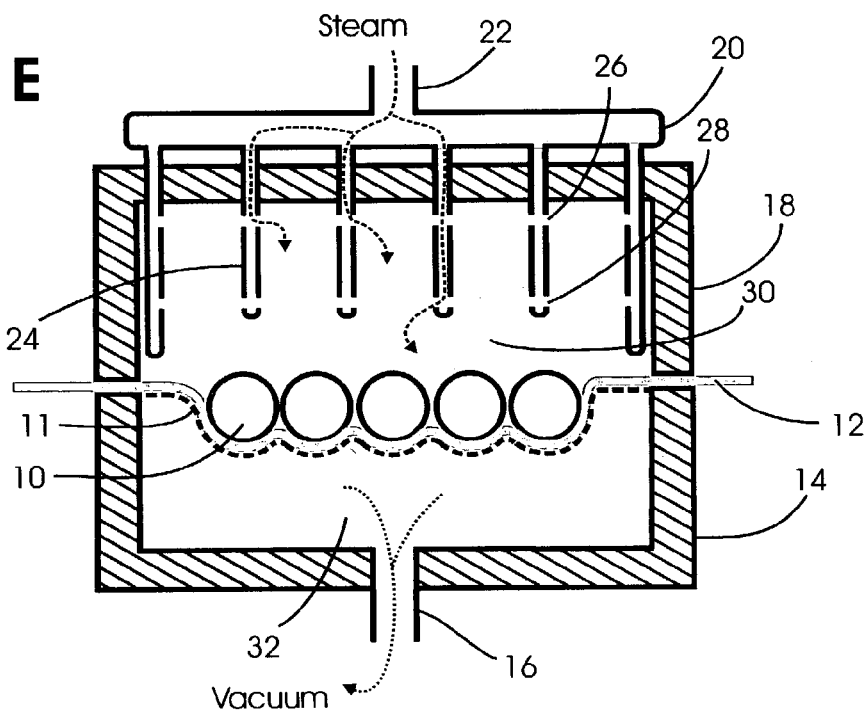
Figure 3:
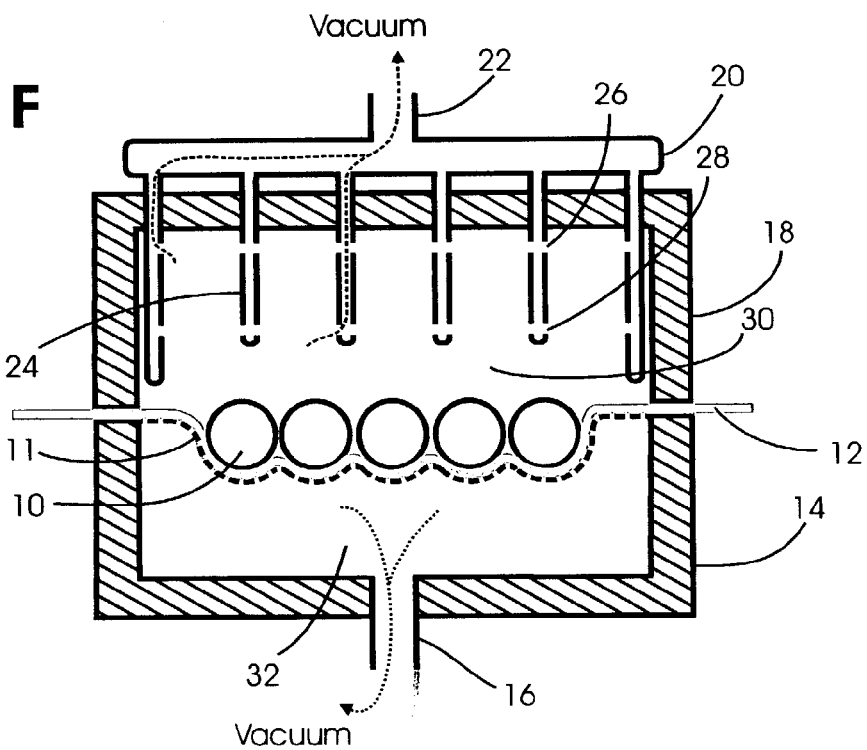
Figure 3:
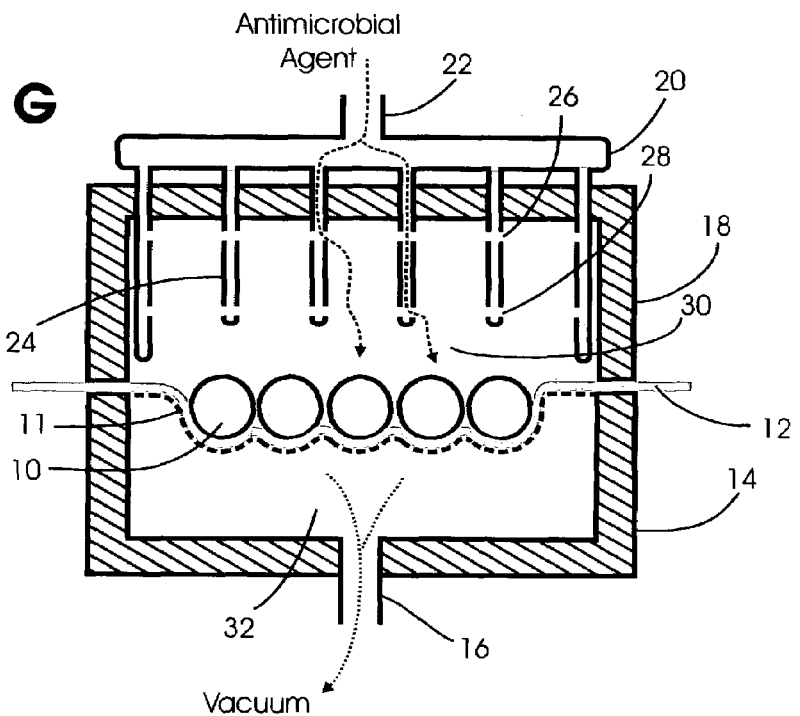
Figure 3:
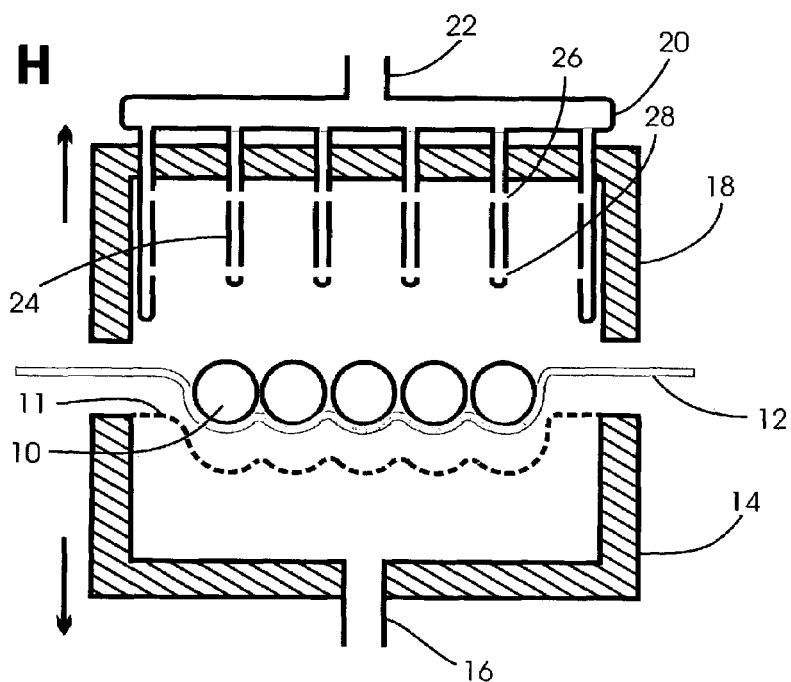

FIG. 3 illustrates one embodiment wherein the thermal surface treatment and the application of the antimicrobial solution are carried out in the preferred order and within the same treatment chamber. The treatment chamber has a movable upper chamber portion 18 and a movable lower chamber portion 14 which may close around and thereby contain food product 10 (including five wieners in FIG. 3) within the food cavity 13 formed from the lower web 12. Panel A shows the treatment chamber in the open position whereby the food product 10 can be indexed into the proper position for treatment. Panels B-G show the treatment chamber in the closed and sealed position, whereby the food product may be treated. Panel H shows the treatment chamber being opened after completion of the treatment cycle so that the treated food product can be removed and new, untreated food product can be indexed into position for treatment.

Lower chamber portion 14 has an inlet/outlet port 16 whereby steam and be introduced and removed (preferably by applying a vacuum) and a perforated support 11 which cradles and support the lower web 12, and especially the food cavity 13, during at least part of the treatment cycle. Perforated support 11 allows steam (or other gas) to freely pass through. Upper chamber portion 18 has a treatment manifold 20 with an inlet/outlet port 22 and treatment fingers 24 arranged and sized so that the individual food products 10 can be individually separated and treated between the treatment fingers 24. Each treatment finger 24 has at least one port or opening (and preferably at least an upper port 26 and lower port 28) in gaseous communication through the treatment manifold 20 to the inlet/outlet port. Steam and the antimicrobial solution can be introduced into the treatment chamber via manifold 20 and treatment fingers 24 as appropriate. When the treatment chamber is in the closed and sealed position (see Panels B-G), a closed lower space 32 is created bounded by the inner surfaces of the lower chamber 14 and the lower surface of the lower web 12; gases introduced into this closed lower space 32 do not contact the food product 10. When the treatment chamber is in the closed and sealed position (see Panels B-G), a closed upper space 30 is created bounded by the inner surfaces of the upper chamber 18 and the upper surface of the lower web 12; gases introduced into this closed upper space 30 will contact the food product 10. The treatment fingers 24 are also be contained in the closed upper space 30. Treatment of the food product 10 will occur within the closed upper space 30.

The treatment method will now be described using FIG. 3. As shown in Panel A, the food product 10 in the package cavity 13 of the lower web 12 is indexed into position for treatment. Once in proper position, the lower chamber portion 14 is raised and/or the upper chamber portion 18 is lower to close and seal the treatment chamber as shown in Panel B. The food product 10 is contained within closed upper space 30. As next shown in Panel C, a vacuum is applied to closed upper space 30 through the manifold 20 while steam (or other pressurized gas) is introduced into closed lower space 32 (now formed on both sides of perforated support 11). The combined effect of the vacuum in the closed upper space 30 and steam or other pressurized gas in closed lower space 32 is to force the lower web 12 and the food product 10 to move such that each individual food product is now located between two treatment fingers 24. By lifting the food product in the manner illustrated in Panel C, improved exposure of the entire food surface to the following thermal surface treatment step can be obtained. Other means for lifting and separating the food product (e.g., mechanical lifters) can be used if desired.

In Panel D, which represents the thermal surface treatment, steam is introduced through manifold 20 and treatment fingers 24 via upper and lower ports 26 and 28, respectively. Since the food product is located between the upper and lower ports 26 and 28, respectively, the exposure of the food surfaces to the steam is very efficient. In order to keep the food product 10 between the treatment fingers 24 during this stage of the treatment process, the steam (or other pressurized gas) introduced into the closed lower space 32 is at a higher pressure than the steam used for the actual thermal surface treatment in the closed upper space 30 so as to maintain the lower web 12 in the position shown.

Once thermal surface treatment is complete, steam is maintained in the closed upper space 30 while the closed lower space 32 is vented as shown in Panel E. This allows the lower web 12 and the food product 10 to drop down to the position of the perforated support 11. As shown in Panel F, a vacuum is then applied to both the closed upper space 30 and the closed lower space 32. The vacuum applied to the closed upper space 30 effectively removes any remaining steam within the space as well as at least some of the condensed moisture that may have formed on the food product during the thermal surface treatment step (Panel D). Application of the vacuum to the closed upper space 30 thus allows both removal of surface water as well as cooling of the food product 10.

Treatment of the food product 10 with an antimicrobial agent is then carried out as illustrated in Panel G by introducing the antimicrobial agent (e.g., in the form of a liquid solution or a spray) through manifold 20 and treatment fingers 24. The antimicrobial solution is allowed to coat at least a portion of the surface of the food product 10 and collect in the package cavity 13. After completion of the antimicrobial treatment, the upper and lower treatment chambers are opened as shown in. Panel H so that the treated food product 10 in package cavity 13 can be sealed by applying the upper web (not shown) and so that new food product can be indexed into position to repeat the cycle. The antimicrobial solution remains within the package cavity after seal of the product package and can effectively coat all surfaces of the food product.

A summary of the treatment cycle illustrated in FIG. 3 is provided in the Table below:

|  | Panel in FIG. 3 | | | | | | | |
| --- | --- | --- | --- | --- | --- | --- | --- | --- |
|  | A | B | C | D | E | F | G | H |
| Upper Chamber: | | | | | | | | |
| Position | up | down | down | down | down | down | down | up |
| Vacuum | off | off | on | off | off | on | off | off |
| Steam | off | off | off | on | on | off | off | off |
| Antimicrobial Agent | off | off | off | off | off | off | on | off |
| Lower Chamber: | | | | | | | | |
| Position | down | up | up | up | up | up | up | down |
| Vacuum | off | off | off | off | on | on | on | off |
| Steam | off | off | on | on | off | off | off | off |
| Function | Indexing | Closing | Lifting & Separating | Thermal Surface Treatment | Dropping | Drying | Antimicrobial Treatment | Opening |

Generally, the entire cycle (from Panel A to Panel H in FIG. 3) is carried out in less than about 10 seconds, and more preferably in about 4 to about 6 seconds. The thermal surface treatment step is generally carried out in less than about 5 seconds, and more preferably in about 1 to about 2 seconds. Generally, the steam used to affect thermal surface treatment is at a temperature of about 240 to about 280° F. The short duration of the thermal surface treatment step helps to insure that only the surface temperature of the food product is increased to affect thermal treatment of the surface while maintaining the interior temperature at significantly lower levels. Generally the surface temperature of the food product is raised to about 200 to about 240° F. during the thermal surface treatment step. If desired, additional thermal surface treatment cycles can be carried out whereby the food products are exposed to additional heat treatments. Using such multiple thermal surface treatment steps, the length of each individual thermal surface treatment step can be decreased.

After completion of the treatment cycle shown in FIG. 3, the upper web is applied and then heat sealed to the lower web as to form a suitable package. The completion of the package should preferably be conducted immediately (i.e., a few seconds) after the completion of the treatment cycle in order to minimize potential exposure of the food product to pathogenic contamination. If desired, the path from the treatment cycle to the sealing station can be enclosed to further minimize potential exposure. Additionally, the enclosed treatment area can be flushed with sterile or otherwise treated (e.g., HEPA filtered) air or inert gas and, if desired, be maintained at a positive pressure relative to the outside of the enclosure in order to minimize possible contaminates from entering the enclosed space. Of course, as one skilled in the art will realize, the process itself (i.e., from the beginning of the surface treatment and antimicrobial treatment through the vacuum sealing station) could be maintained in a closed, positive pressure room supplied with sterile or otherwise treated (e.g., HEPA filtered) air or inert gas in order to provide further protection again contamination. Additionally, the enclosed treatment area (and especially the surface of the upper web which will contact the food product during sealing) can be exposed to sterilizing radiation (e.g., UV radiation).

Figure 4:
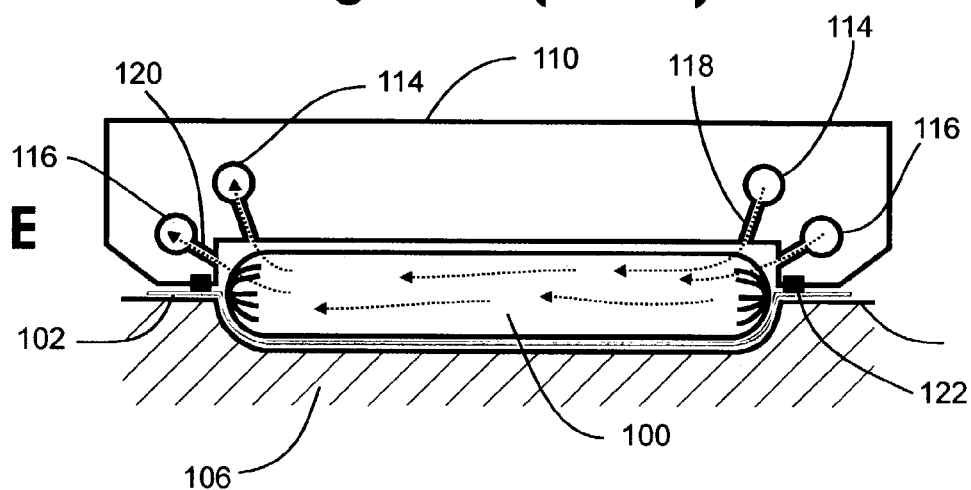
FIG. 4 illustrates a preferred embodiment wherein the thermal surface treatment and antimicrobial application are carried out in separate treatment stations. Panel A illustrates step 1 (wiener on moving platen); Panels B and C (side and end views, respectively) illustrate step 2 (forming sealed thermal treatment chamber); Panels D and E illustrate step 3 (thermal treatment using steam); Panel F illustrates step 4 (optional condensate removal); and Panel G illustrates step 5 (antimicrobial treatment). This embodiment generally follows the preferred flowcharted method illustrated in FIG. 2.
Figure 4:
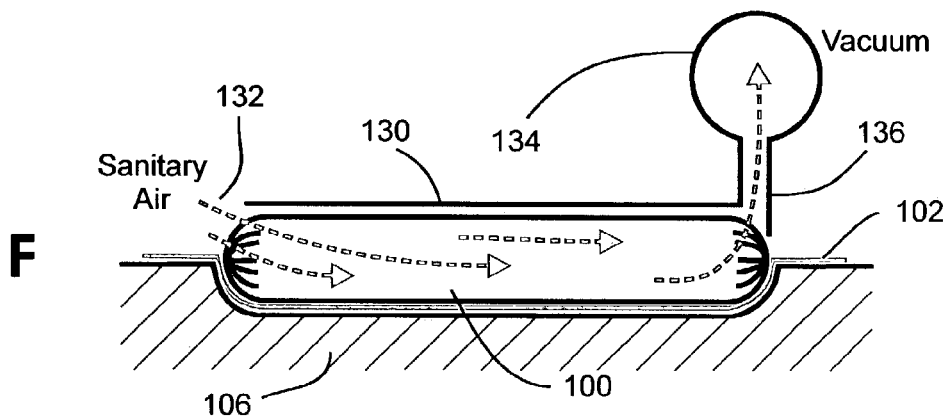
Figure 4:
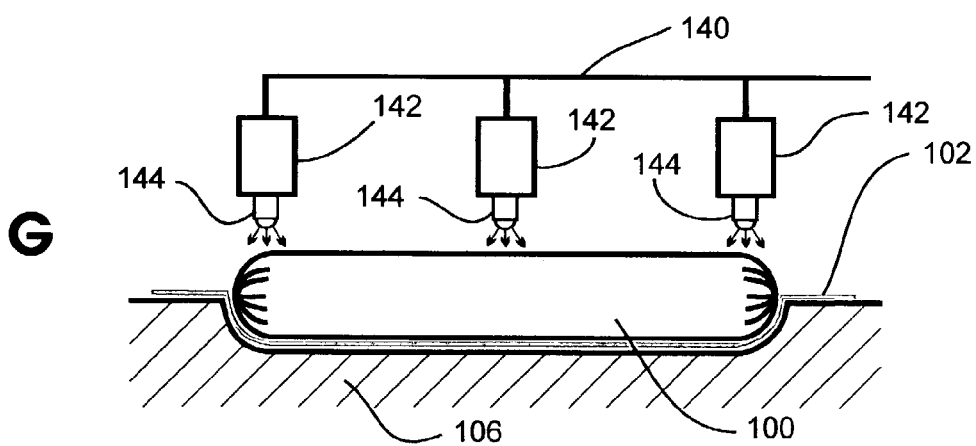

FIG. 4 illustrates a preferred embodiment of the present invention wherein the food product is first subjected to the thermal surface treatment and then the antimicrobial treatment and wherein the thermal surface treatment and the antimicrobial treatment are carried out in separate stations. Panel A shows the flexible packaging film 102 (which will ultimately form the bottom film of the package) laid on a conveyor (not shown) comprised of continuously moving platens 106 (preferably metal) that have cavities 108 in their upper surface having the approximate shape of the lower half of the desired package. The film 102 is formed down into the cavity 108 and is held in the cavity by the vacuum created by the forming process (not shown). The conveyor formed by these connected platens 106 then passes by the loading station which places wieners 100 on top of the film layer 102 in each platen cavity 108. Wieners 100 generally have wrinkles 104 on either end formed during the manufacturing process. Preferably the wieners are moved through the entire process (i.e., from thermal treatment, antimicrobial application, and sealing the final package) within the platens 106.

As shown in Panels B (side view) and C (end view), the platen 106 containing the wieners 100 is then mated with an upper platen 110 (preferably metal) using seal or gasket 122 to form a closed treatment chamber 124. Generally the upper platen 110 is moved down as illustrated by the arrow to affect the seal. The treatment chamber 124 is formed via cavity 108 and the cavity 112 in the upper platen 110 and the seal 122. The lower platen 106 and the upper platen 110 form a sealed thermal treatment chamber 124 such that the film passes out of the chamber under the seal. The packaging film 102 should not contact the portions of the upper platen which will operate at elevated temperatures above the melting point of the film. The lip seal is designed such that the seal areas of the film are not subjected to direct steam exposure and such that the upper platen does not contact the film; the film below the wieners is not significantly affected by exposure to the steam since it is intimate contact with the relatively cool lower platen. Of course, the packaging film 102 may, if desired, be a thermally stable film so that will not melt or distort even if contacted with the steam used during the thermal treatment cycle.

The upper platen 110 is equipped with two sets of steam manifolds 114 and 116 on either side. Steam manifolds 114 are connected to treatment chamber 124 via passageways 118 and top ports 119. Steam manifolds 116 are connected to treatment chamber 124 via passageways 120 and side ports 126. Both steam manifolds 114 and 116 are connected to values (not shown) whereby steam may be introduced into, and removed or vented from, the treatment chamber 124 as desired (and as illustrated in Panels D and E).

Operation of the thermal treatment cycle is shown in Panels D and E. In Panel D, steam (illustrated by the dotted arrows) is introduced into the treatment chamber 124 via one set of steam manifolds (the left hand set of manifolds 114 and 118 in Panel D), passes along the length of the wieners 100, and exits from the treatment chamber 124 via the other set of steam manifolds (the right hand set of manifolds 114 and 118 in Panel D). In Panel E, the direction of the steam (again illustrated by the dotted arrows) is reversed. Thus, in each case, steam is effectively directed on each end (and the associated wrinkles 104) of the wieners 100. The steps illustrated in Panels D and E can be repeated, if desired, to further expose the wieners to the thermal surface treatment. Generally, it is preferred that thermal surface treatment consists of at least four bursts (i.e., Panel D, Panel E, Panel D, followed by Panel E for a four burst sequence) where each burst is of about 0.1 to about 0.4 seconds in duration.

The side and top ports 126 and 126, respectively, are preferably designed to direct jets of steam both at wrinkled ends 104 of the wieners as well as between the wieners (see Panel C) to provide some lift and/or movement of the wieners 100 within the thermal treatment chamber 124. Generally, the use of relatively high pressure steam (generally about 10 to about 100 psi and more preferably about 20 to 40 psi) directed towards the ends of the wieners 100 will provide sufficient lift or force to move, jiggle, or jostle the wieners within the thermal treatment chamber 124 so as to expose essentially all surfaces to the thermal treatment. As those skilled in the art will realize, the angle of the passageways 120 and 118 (relative to the long axis of the wieners), the pressure of the steam, and the diameter of the side and top ports 126 and 119, receptively, can be adjusted to increase the velocity of the steam within the thermal treatment chamber 124 and provide the desired movement. Generally, the diameters of the side and top ports 126 and 119 is about $\frac{1}{32}$ to about $\frac{1}{4}$ inches, and more preferably about $\frac{3}{32}$ to about $\frac{5}{32}$ inches. Preferably, the steam is directed towards the wrinkled ends as they are a special challenge as they may provide potential harborage points for microbes. Although not shown in Panels D and E, condensate is expected to form within the thermal treatment chamber or cavity 124; at least a portion of this condensate will remain within the thermal treatment chamber or cavity 124. Such condensate can be, and preferably is, at least partial removed in a later process step (Panel F) and prior to the antimicrobial treatment step (Panel G).

In an especially preferred embodiment, the wieners 100 are exposed to five distinct process steps that take place over a very short duration (e.g., about 1 to about 3 seconds) in which the upper 110 and lower 106 platens are engaged to form a pressure-containing chamber 124. First, steam (e.g., for about 0.3 seconds duration) is admitted from the ports 126 and 119) at one end of the thermal treatment cavity 124. At the same time the vent valve (not shown) attached to the opposite ports 126 and 119 at the other end of the thermal treatment chamber 124 are opened such that there is a definite flow of condensing steam past the wieners 100. After the first thermal treatment step (Panel D), the steam and vent valves are reversed such that the steam flow is reversed (Panel E) (again for about 0.3 seconds duration). These two steps are then repeated for the third and fourth steps. Generally, pressures in the thermal treatment cavity 124 rise to a maximum of about 20 psi at the end of the last steam step. Lastly, the vents are opened at both ends of the thermal treatment cavity 124 in order to depressurize the cavity prior to disengagement (not shown in FIG. 4) of the upper 110 and lower 106 platens.

After completion of the thermal treatment step and venting of the treatment cavity 124, the upper 110 and lower 106 platens are disengaged (not shown) and the lower platen 106 is moved to the next stage. Preferably, the next stage is an optional condensate removal step or unit as illustrated in Panel F. A curved shroud 130 just above the wieners 100 is used to channel high velocity gas 132 longitudinally past the wieners (as illustrated by the broken arrows in Panel F). Of course, the gas used to remove the condensate should be sanitary or otherwise purified gas (preferably air). The gas velocity is created by maintaining low level vacuum 134 (approximately 25 inches of water column) in a suction slot along one edge of the shroud 130. A baffle plate 136 minimizes gas flow other than that which comes across the wieners. Even if this optional condensate removal step is used, it is not necessary to remove all of the condensate that may have collected during the thermal treatment cycle. Generally, only a portion of the condensate is removed so as to prevent excess dilution of the antimicrobial solution in the next step. Optionally, at least a portion, of the surface condensate (assuming the thermal surface treatment was affected using steam) can be removed using, for example, a vacuum or suction and/or a stream of gas (e.g., sanitary air) across the surface of the food product. If used, it is not necessary to remove all condensate; generally removal of about 80 to about 90 percent is preferred although lesser or greater amounts can be removed, if desired. Moisture droplets and/or moisture vapor can be removed from the wieners into a collection system.

Although not shown in FIG. 4, a sensor (preferably a non-contact infrared thermometer) is preferably used to verify that the thermal treatment step was effectively conducted on each and every package. This thermometer can be placed immediately after the condensate removal step (or immediately after the thermal treatment step if the option condensate removal step is not used). Although the temperature will have fallen off significantly from the highest level reached at the end of the thermal treatment step, the surface temperature should still be elevated relative to ambient (e.g., generally about 100 to about 140° F.) after the condensate removal. If the senor confirms that sufficient thermal treatment was applied, the wieners can proceed to the antimicrobial treatment station (Panel G). If sufficient thermal treatment has not taken place, the treatment line should be stopped until corrective actions have been implemented to correct the problem. Of course, insufficiently treated product must be retreated or discarded.

As illustrated in Panel F, the next step in the process is to apply the desired amount of an antimicrobial solution to the wieners. Preferably, the antimicrobial solution is applied to both ends and to the middle of the wieners via pumps 142 and nozzles 144 attached to antimicrobial supply line 140. Each wiener may have its own set of nozzles 144 or nozzles may be designed so as to apply the antimicrobial solution to more than one wiener at a time. Although not shown, the lower platen 106, as it moves into the antimicrobial treatment station, preferably triggers a sensor that allows a controller to activate the nozzles 144 at the correct time and for the correct duration. Pressure to the nozzle banks is preferably maintained by a positive displacement pump 142. Preferably, proper delivery of the correct amount of solution by the nozzles 144 is continuously monitored by tracking of the supply pressure. Failure to deliver the correct amount of solution due to a faulty nozzle or plugged nozzle will result in an incorrect pressure dip in the supply system. Such incorrect pressure can be used to automatically switch over to a second nozzle bank system (not shown but essentially equivalent to the system shown in Panel G) and an alarm condition for the primary nozzle bank. Failure of the second nozzle bank will result in a major line fault with packaging halted until the problem is corrected.

Immediately after the spray application is complete, the lower platen containing the treated wieners is moved to the packaging station (not shown) wherein an upper film layer is applied and the upper and lower film layers are sealed to form the package. Preferably, the packaging step includes an evacuation step whereby essentially all of the air is removed from the package (i.e., vacuum sealing). The sealed packages are then removed from the combined treatment line for any further packaging and/or labeling to obtain final packages suitable for purchase by a consumer.

The invention is applicable to any food product which is to be vacuum sealed, particularly those which may be prone to pathogenic contamination. It is contemplated that the solutions and methods of the invention have applicability to both animal-derived and plant-derived food products including, but not limited to, raw meat cuts, processed meat (e.g., wieners and meat products such as bologna, ham, turkey, and the like), hams, lamb, steak, hamburger, poultry including chicken, turkey, duck, and goose, as well as fish, dairy products such as semi-soft and hard cheeses, processed cheese, vegetable products including lettuce, tofu, coleslaw, soybean derived protein substitutes for meat, fruits, and the like. The food may be sliced or unsliced. Non-limiting examples of processed meats that may bemused with the current invention include cooked or smoked sausages such as frankfurters or wieners and ready-to-eat sliced meat products such as luncheon meats (e.g., bologna), ham, turkey, and the like; generally, the process of the present invention will be employed prior to the slicing station where the actual slices are formed. The present invention is especially adapted to packaging wieners; generally such packages contain 2 to 12, and preferably 4 to 10, wieners; of course, as those skilled in the art will realize, the present invention can be used for packages containing fewer or greater numbers of wieners.

A food scientist can use well-known methods to determine conditions of the thermal surface treatment (i.e., temperature and duration) and the total amount of antimicrobial agent and volume of antimicrobial solution to apply to the vacuum-packed foods to assure the desired coverage, preferably complete coverage, of the food stuff and the desired pathogen kill. Specific modification of the temperature, surface tension, viscosity, and volatility of the solution using in the antimicrobial treatment may be made to achieve the desired distribution of active ingredients(s) throughout the package. Preferably, this distribution is complete coverage of the surface of the food being vacuum sealed.

As with regard to the antimicrobial treatment, for example, and not intended to be limiting, a package containing about 8 to 12 wieners and about 0.25 to about 10 $cm^3$ of the antimicrobial solution will generally prove to be satisfactory. As noted above, the total amount of free liquid is preferably less than about 10 $cm^3$. The antimicrobial solution can have a viscosity similar to that of water or can be more or less viscous so long as it is uniformly distributed over the exterior surfaces of the food product after the package is vacuum sealed. The amount of antimicrobial agent, viscosity, surface tension, and similar characteristics can be varied to achieve the desired uniform distribution. Preferably, in order to increase the ease and efficiency of coating the surface of the food with the antimicrobial solution, the solution is applied to only a portion of the food surface, or applied to only a portion of a sealable package.

In one preferred embodiment, the antimicrobial solution is sprayed on the top surface of the food being vacuum-packed. In another preferred embodiment, the antimicrobial solution is sprayed onto the surfaces most likely to harbor bacteria and/or microbes. Using wieners as an example, the end portions generally have non-uniform surfaces (i.e., wrinkles or other cavities). Bacteria and/or microbes located in such non-uniform surface areas will generally be more difficult to kill or otherwise eliminate. Thus, applying the antimicrobial solution directly onto these non-uniform surface areas will increase kill rates within these difficult areas and increase the overall effectiveness of the treatment. During or after the vacuum-packing process, substantially all of the remainder of the surface of the food is covered by the antimicrobial solution due to forces that are inherent in the vacuum sealing and packaging processes. Not intended to be limited by theory, it is believed that a combination of forces, including capillary action, act on the antimicrobial solution during and after the vacuum-packing process, to uniformly distribute the antimicrobial solution over the entire exterior surface of the food.

Vacuum-packing procedures for foods are well-known in the art. For the current invention, any standard vacuum-packing system may be used. As known (in the art, specific details of vacuum-packing procedures vary depending on the size and type of food that is being sealed. For example, but not intended to be limiting, where the food being vacuum-packed is a 4 to 10-pack of wieners, the vacuum-packing may be performed using commercially available packaging equipment using vacuum pressures of about 20 to 29 inches mercury and sealing temperatures appropriate for the packaging material employed.

Heat-sealable food packaging materials or films suitable for use in the present invention include materials typically used for heat-sealing procedures. For example, suitable films include cellulose materials and thermoplastic stretch or shrink films, and may be monolayer or multilayer films. Shrink films are preferably formed into heat shrinkable, biaxially-oriented bags. Suitable films include, for example, polymeric materials including cellulosic materials such as regenerated cellulose or cellulose carbamate, plastics such as homopolymers or copolymers of polyolefins (e.g., polypropylene, polyethylene, polyamides, polyethylene terephthalate, polyvinylidene chloride copolymers, ethylene-vinyl acetate copolymers, saran, polyvinylchloride, and the like), or proteinaceous films such as collagen. Generally, films having good flexibility are preferred as they can more closely and uniformly conform to variations in the contours of the product, thereby providing better liquid distribution throughout the package.

In certain preferred embodiments, the food packaging of the current invention is intended for wieners and includes two continuously extruded polymeric sheets that are molded to form upper and lower shells for the wieners. The sheets for these embodiments are typically molded into a continuous series of upper and lower halves of a tube-like shape that have a ½ circle form in cross section and run the entire length of the hot dog.

The antimicrobial solution used in the methods of the current invention contains an antimicrobial agent that can include any food-grade antimicrobial compound. The agent may be used individually or in combination with other agents. Although the antimicrobial solutions are water-based, other acceptable food-grade solvents can be used (e.g., alcohol, oil, and the like). If water-based, pH and other modifications may be made to allow distribution of agents not normally soluble in water.

Suitable antimicrobial agents may be effective against molds, yeasts, and/or bacteria. Suitable agents are believed to include, but are not limited to, antibacterial agents (also referred to as bactericidal agents) which are effective to kill or inhibit bacteria (e.g., antibiotics such as nisin, nisin-containing whey, natamycin, subtilin) or *Pediococcus*-derived bacteriocins (e.g., pediocin); food-grade acids and salts of food-grade acids (e.g., acetic acid, lactic acid, malic acid, phosphoric acid, sorbic acid, benzoic acid, mixtures thereof, and the like); heat resistant antibacterial enzymes such as lysozyme; spice extracts having antibacterial properties; plant extracts having antibacterial properties (e.g., hop extracts; rosemary extracts, rosemary extract acids such as rosmarinic acid and carnosic acid); inorganic salts having antibacterial properties (e.g., acidified calcium sulfate); and other agents such as liquid smoke, parabens, or ozone; mixtures of such agents can also be used. In certain preferred embodiments, the antimicrobial agent is selected from nisin, hop extracts, tertiary butylhydroquinone (TBHQ), cetyl pyridium chloride, bacteriocins, and mixtures thereof.

Suitable antimicrobial solutions are also described in copending application Ser. No. 10/378.330, filed on the same date as the present application entitled "Anti-*Listeria* Compositions For Use in Food Products", which is incorporated by reference. Such antimicrobial compositions contain nisin derived from whey, pediocin, an edible organic acid (e.g., lactic acid), and a phenol-based antioxidant (e.g., tertiary butylhydroquinone). More preferably, these aqueous antimicrobial compositions comprise nisin derived from whey, pediocin derived from whey, an edible organic acid, and a phenol-based antioxidant; wherein the composition has a nisin activity of at least about 900 lU/ml, a pediocin activity equivalent to at least about a 16 mm inhibition zone, a phenol-based antioxidant concentration at least about 0.5 percent, a pH of about 3 to about 5, and is essentially free of dairy allergens. Even ore preferably, these aqueous antimicrobial compositions comprise nisin derived from whey, pediocin derived from whey, an edible organic acid, and a phenol-based antioxidant, wherein the composition has a nisin activity of about 1000 about 3000 lU/mi, a pediocin activity equivalent to at least about a 18 mm inhibition zone, a phenol-based antioxidant concentration of about 0.75 to about 1.5 percent, a pH of about 3.3 to about 3.5, and is essentially free of dairy allergens.

Hop extracts are the most preferred antimicrobial agents for use in the present invention. Especially preferred antimicrobial agents are those described in copending application Ser. No. 10/378.330, filed on the same date as the present application entitled "Improved Hop Beta Acid Compositions For Use in Food Products", which is incorporated by reference. Such especially preferred antimicrobial compositions comprise a hop beta acid, a food grade organic acid, a soluble potassium ion source, and an optional antioxidant in a carrier solvent, wherein the carrier solvent comprises a food grade alcohol, a food grade glycol, or mixtures thereof. Preferably the antioxidant is included in the composition since it appears to stabilize the compositions and provides a longer shelf life. Even more preferably, this antimicrobial composition comprises about 0.1 to about 4 percent of a hop beta extract, about 0.1 to about 10 percent of a first food grade-organic acid, about 0.1 to about 20 percent of a soluble potassium ion source, 0 to about 10 percent of a food grade antioxidant, and about 50 to about 95 percent of a carrier solvent comprising a food grade alcohol, a food grade glycol, or mixtures thereof. An even more especially preferred antimicrobial composition comprises about 0.1 to about 4 percent of a hop beta extract, about 0.1 to about 10 percent of a first food grade organic acid, about 4 to about 20 percent of a soluble potassium ion source, about 0.1 to about 10 percent of a food grade antioxidant, and about 50 to about 95 percent of a carrier solvent comprising a food grade alcohol, a food grade glycol, or mixtures thereof. Preferably the soluble potassium ion source is a potassium salt of a second food grade organic acid which is soluble in the carrier solvent.

The antimicrobial solution should, of course, contain an effective amount of the desired antimicrobial agent or agents. The concentration of the antimicrobial agent can vary depending on the specific antimicrobial agent or agents used. The antimicrobial solution can be aqueous or non-aqueous based or may consist essentially of only the antimicrobial agent (i.e., essentially no carrier or solvent).

In the antimicrobial solutions of the current invention, such antimicrobial agents may include additives such as binding agents, buffers, emulsifiers, transfer aids, or chelating agents (e.g., ethylenediaminetetraacetic acid (EDTA) or its salts). These agents may enhance the antimicrobial effect of the agent or assist transfer of the antimicrobial solution to the food surface after vacuum sealing. Other ingredients which are normally used in the manufacture of, or for further treatment of, food packaging film may also be present in or on the film if desired, and they may be used in the same manner and amounts as if the antimicrobial agent had not been used. For example, anti-block and anti-static agents are frequently used with thermoplastic films.

In one non-limiting example of a production method according to the current invention, one-half tube polymeric molds are formed as described above as a continuously extruded sheet. Wieners are placed on top of one of the one-half tubes (i.e., designated the lower tube). After a thermal surface treatment, preferably using at least one cycle of steam followed by vacuum removal of steam and/or condensed water, a spray of antimicrobial solution is sprayed over the top surface of the wieners (either over the entire top surface or, more preferably, over both ends of the wieners) or an equivalent amount of antimicrobial solution is introduced into the lower tube. The upper tube is then applied on top of the wiener, and the lower and upper tubes are vacuum sealed. During and after the sealing process, the antimicrobial solution spreads over the entire surface of the wieners.

In another non-limiting example of a production method according to the current invention for a sliced processed meat product (e.g., bologna), a bottom film layer having a suitable cavity for receiving the sliced processed meat product is prepared using conventional techniques. After a thermal surface treatment, an appropriate amount of the antimicrobial solution is introduced into the cavity and/or on to the food surfaces and the sliced and stacked processed meat product is within the cavity. A top film is applied and the bottom and top films are vacuum sealed. During and after the sealing process, the antimicrobial solution spreads up and around the exterior surfaces of the meat product.

This process is especially adapted for meat products having discrete areas of fat and lean meat since an essentially compete and continuous antimicrobial film can be obtained in spite of the different surface properties of the discrete areas. Simply dipping such a meat product in an antimicrobial solution or spraying such a meat product with an antimicrobial solution will generally leave areas unprotected. For example, with an aqueous based antimicrobial solution, the solution will tend to "bead up" on the fat-rich areas (i.e., such areas are not wetted), thereby leaving them essentially unprotected. Using the capillary action during the vacuum packaging of the present invention, the surface tension helps to insure complete and continuous coverage of the antimicrobial solution.

Another aspect of the current invention encompasses drying a surface of an article of food before applying the antimicrobial solution. Embodiments of the current invention wherein the food surface is dried prior to being introduced into the food cavity offer several advantages. For example, if the antimicrobial solution is applied to the food surface by dipping in an antimicrobial solution and/or by spraying with the antimicrobial solution, the applied dose can be controlled using liquid viscosity (liquid layer thickness) and concentration. Additionally, surface drying and controlled addition of the antimicrobial solution allows better control of the heat seal area. Keeping excess liquid away from the heat seal area allows better vacuum sealing and reduced seal failure. Additionally, the antimicrobial solution will not be significantly diluted by water on the surface of the food product. Thus, increased pathogen kill and/or protection can be expected. For example, a standard wiener, without pre-drying, would normally have about 0.3 to about 0.6 $cm^3$ surface water/wiener before packaging which, of course, would dilute the antimicrobial solution. By removing at least a portion, and preferably essentially all, of this surface water prior to introducing the antimicrobial solution, higher levels of the antimicrobial agent can be used without adversely affecting the sealing process. Using such a drying step, also allows excess antimicrobial solution to be recycled since it is not diluted with surface water. Thus, for example, pre-dried wieners could be dipped into the antimicrobial solution; any excess which drips off could be collected and reused without diluting the antimicrobial solution.

One of ordinary skill can determine effective volumes of antimicrobial solution for different foods using available methods, as described above. For methods of the current invention incorporating a drying step, typically lower volumes of antimicrobial solution are required; if desired, however, additional volumes can be added to potentially increase protection of the food product.

Virtually any procedure for surface coating foods prior to packaging can be used for the current invention. Such procedures include, for example, dipping and spraying. Methods for applying composition to food packaging are well known in the art and includes methods such as slugging, spraying, and internally coating while stirring, as described in U.S. Pat. No. 4,171,381. Alternatively, the antimicrobial solution may be directly introduced into the packaging, before, after, or at the same time as the food product is introduced into the packaging.

The following examples describe and illustrate the processes and products of the invention. These examples are intended to be merely illustrative of the present invention, and not limiting thereof in either scope or spirit. Unless indicated otherwise, all percentages and ratios are by weight. Those skilled in the art will readily understand that variations of the materials, conditions, and processes described in these examples can be used. All references cited herein are incorporated by reference.

EXAMPLE 1

This example provides the general procedure for vacuum sealing wieners for controlling contamination of a vacuum-sealed product. Surface dried wieners (a total of ten weight 1 lb) were packaged with 3.0 grams/lb of water (control samples) or an antimicrobial solution applied at the bottom of the package using the following method. The wieners were placed on top of a bottom section of a two-part continuously extruded plastic sheet for vacuum-sealing. After the wieners were placed on the bottom section, the water or antimicrobial agent (as indicated in the following examples) were applied. The top section was then placed on top of the wieners and a vacuum sealer was used to seal the bottom and top sections together. The vacuum seal was performed using a commercial vacuum sealer at a vacuum pressure of about 26 inches Hg. When the packages were later opened, wet and shiny surfaces were observed indicating complete coverage over the exterior surfaces.

EXAMPLE 2

This example uses a surface rewetting test to analyze the ability of the liquid application method described in Example 1 to effectively coat or cover the surface of packaged wieners. Surface dried wieners were packaged with water as described in Example 1. Small squares (about 1 mm×1 mm) of "Post-it" paper were applied to wieners at various locations along the top, middle, and bottom of the package. Different physical sublocations within each package were tested including the front and back of links, between links, and against the top or bottom section of the film. Most of the test squares became wetted during the sealing process; all test squares became wetted within 15 minutes after the sealing process was complete. Adding more liquid resulted in faster and, in some cases, immediate wetting. Thus, the method described in Example 1 resulted in complete liquid distribution on the surface of the wieners after packaging.

EXAMPLE 3

This example utilizes a chemical distribution test to analyze the ability of the method described in Example 1 to effectively coat the surface of packaged wieners with an antimicrobial solution. Ten surface dried wieners were repackaged with 3.0 grams of an aqueous antimicrobial solution that included bacteriocins (i.e., nisin and/or pediocin) as the active antimicrobial agent applied at the bottom of the package as described in Example 1. Chemical distribution of the active antimicrobial agent was confirmed using *Listeria* lawn clearance analysis (wiener skin samples were placed on a *Listeria* lawn; a clearance zone growing around the sample indicated antimicrobial agent coverage). For this analysis, wieners were stored for 24 hours at about 34° F. after completion of the vacuum-sealing process. Then the wieners were skinned and chemical distribution of the antimicrobial agent using the *Listeria* lawn clearance technique was measured for 15 samples/package wherein the samples were taken from various locations from the wieners (i.e., first end, middle, second end). Using this method, uniform levels of the active ingredient were measured in all samples.

EXAMPLE 4

This example utilizes a microbial challenge to analyze the ability of the method described in Example 1 using several antimicrobial agents, to effectively protect the surface of packaged wieners from microbial challenge. Ten surface dried wet or wet wieners were repackaged with 6.0 grams/lb wiener of an antimicrobial solution that included lactic acid, potassium lactate, and hop extract in a propylene glycol carrier. The antimicrobial agent was applied at one end or at both ends of a package prior to sealing. Microbial challenge was performed by inoculating the packaged wieners with up to 10,000 CFU of a five-strain *Listeria* cocktail at four different spots within the package; each sampling spot was remote from the location of the actual application of the antimicrobial solution. Microbial inactivation was determined using standard USDA *Listeria* methods.

Results of these experiments indicated that the vacuum-sealing method for applying the antimicrobial agent was effective for protecting the sealed meat product from microbial contamination (i.e., essentially complete inactivation at locations throughout the packaging). No colony forming units of the challenge microbe were found using the standard USDA *Listeria* test methods.

EXAMPLE 5

The total amount of liquid carrier that may be used in the method described in Example 1 for surface coating a food with an antimicrobial agent according to the current invention while maintaining effective heat sealing was analyzed. Based on this evaluation, up to 10.0 grams of total surface water (including surface water on the wieners and added antimicrobial solution) could be incorporated into a package of ten test wieners (i.e., double packages each containing a single layer of five wieners) without adversely effecting the heat seal effectiveness; test wieners had approximately 128 in$^2$ surface area per lb of product. Wieners packaged in multilayers within a single package would be expected to accommodate higher volumes of the antimicrobial solution. Generally, however, it is expected that different package or wiener configurations (multilayer packages, jumbo sized or longer length wieners, and the like) will utilize similar liquid film thicknesses to provide bacterial protection and effective heat sealing.

EXAMPLE 6

A propylene glycol-based antimicrobial solution containing about 20,000 ppm hop extract was added at a level of about 1.1 ml/package to a vacuum sealable package containing five test wieners which had not been surface dried. Since the solubility of the hop extract in the propylene glycol solution was in excess of about 30,000 ppm, the hop extract was completely solubilized in the initial solution. When added to the packaged wieners and vacuum sealed, however, the propylene glycol solution was diluted with about 1.5 g surface water (about 0.3 g surface water/wiener) and the solubility of hop extract drops rapidly to about 10,000 ppm. The sudden solubility drop results in very fine crystal formation which provide a distinct "milky" appearance to the packaged material. This "milky" appearance thereby provides a marker to confirm that the antimicrobial solution is present and that coverage of the exterior surfaces of the wieners is complete. The "milky" appearance gradually disappears within about 1 to 3 weeks of refrigerated storage; thus, by the time the package reaches the consumer market, the "milky" appearance is no longer apparent.

EXAMPLE 7

Frozen or refrigerated wieners were inoculated with about 10,000 *Listeria* organisms per five wiener package. The wieners were then exposed to pressurized steam for a short time period (less than about 1 second) to heat the wiener surface. The ends of the heated wiener surfaces were then sprayed with a propylene glycol-based antimicrobial solution containing about 20,000 ppm hop extract at a level of about 1.1 ml/package to a vacuum sealable package, and then vacuum sealed. After 24 hour storage under refrigerated temperatures, the complete eradication of *Listeria* was observed. Control samples prepared without the antimicrobial solution but subject to the same heating regime were positive for *Listeria*.

EXAMPLE 8

Using a treatment chamber as illustrated in FIG. 4, *Listeria* inoculated (about $10^4$ CFU/package) wieners were treated under various conditions with thermal surface treatment alone, antimicrobial treatment using hops acid extract-containing antimicrobial solution alone, and combination treatment (i.e., steam surface treatment followed immediately by antimicrobial treatment). The antimicrobial solution contained 20,000 ppm hop beta acids, 0.3M potassium lactate, and 0.3% lactic acid in propylene glycol. Samples were evaluated for *Listeria* after 24 hours of refrigerated storage. *Listeria* test methods found in Microbiology Laboratory Guidebook, USDA, 3rd Ed., Chapter 8, Revision 3 (1998), which is hereby incorporated by reference, were used. The following results were obtained.

|  | Thermal Surface Treatment (3.25 sec) Only | Thermal Surface Treatment (1.5 sec) Only | Antimicrobial Treatment (2.5 g) Only | Combined Thermal Surface Treatment (1.5 sec) & Antimicrobial Treatment (1 g) |
|---|---|---|---|---|
| Number of Tests | 158 | 36 | 69 | 102 |
| Probability of 4 log Listeria Kill | 80% | 0% | 45% | 100% |

Throughout this application, various patents, publications, books, and nucleic acid and amino acid sequences have been cited. The entireties of each of these patents, publications, books, and sequences are hereby incorporated by reference into this application.

What is claimed is:

1. A method for controlling contamination of a food product with a surface in a vacuum-sealed package, said method comprising placing the food product in a vacuum-sealable package, treating the food product while in the vacuum-sealable package with a combined treatment of (1) thermal surface treatment and (2) application of a solution of one or more antimicrobial agents to the surface of the food product, and then vacuum sealing the vacuum-sealable package to form the vacuum-sealed package such that the vacuum sealing uniformly disperses the solution over the surface of the food product, and wherein the combined treatment of the food product while in the vacuum-sealable package is effective for killing or inactivating essentially all pathogenic contamination in the vacuum-sealed food product.

2. The method of claim 1, wherein the food product is a processed meat.

3. The method of claim 2, wherein the food product is a plurality of wieners.

4. The method of claim 3, wherein the plurality of wieners consists of 4 to 10 wieners.

5. The method of claim 3, wherein the thermal surface treatment is less than about 3 seconds and is followed by the application of one or more antimicrobial agents and wherein the one or more antimicrobial agents includes a hops acid.

6. A method for controlling pathogenic contamination in a vacuum-sealed food product, said method comprising: (1) providing a food product with a food surface; (2) providing a flexible vacuum-sealable package having a package cavity for holding the food product; (3) placing the food product into the package cavity; (4) treating the food product in the package cavity for a time and temperature effective for thermal surface treatment; (5) introducing an effective amount of an antimicrobial solution containing an antimicrobial agent into the package cavity containing the food product; and then (6) vacuum sealing the food product in the package such that the package cavity and the package shrinks around the food product and the antimicrobial solution is uniformity dispersed over the food surface, wherein the thermal surface treatment and the antimicrobial solution are, in combination, effective for killing or inactivating essentially all pathogenic contamination in the vacuum-sealed food product.

7. The method of claim 6, wherein the food product is a processed meat.

8. The method of claim 7, wherein the food product is a plurality of wieners, wherein each wiener in the plurality of wieners has a cylindrical body with a first end and second end and wherein the plurality of wieners in the vacuum sealed package are aligned along the cylindrical bodies with the first end of each wiener adjacent to the first ends of the other wieners.

9. The method of claim 8, wherein the time for thermal surface treatment is less than about 3 seconds, wherein the effective amount of the antimicrobial solution is about 0.25 to about 10 $cm^3$, and wherein the effective amount of the antimicrobial solution and surface water that may be present on the food surface does not significantly affect vacuum sealing in step (6).

10. The method of claim 9, wherein the food surface is dried after thermal surface treatment and before the introduction of the antimicrobial solution.

11. The method of claim 6, wherein the antimicrobial agent is selected from the group consisting of food-grade acids and their salts, bacteriocins, spice extracts, plant extracts, nisin, hops acid extracts, tertiary butylhydroquinone, cetyl pyridium chloride, and mixtures thereof.

12. The method of claim 6, wherein the antimicrobial agent is selected from the group consisting of acetic acid, lactic acid, malic acid, phosphoric acid, sorbic acid, benzoic acid, and mixtures thereof.

13. The method of claim 6, wherein the antimicrobial agent is a hops acid extract.

14. The method of claim 6, wherein the antimicrobial agent comprises an antimicrobial composition which comprises a hop beta acid, a food grade organic acid, a soluble potassium ion source, and an antioxidant in a carrier solvent, wherein the carrier solvent comprises a food grade alcohol, a food grade glycol, or mixtures thereof.

15. The method of claim 9, wherein the antimicrobial agent is selected from the group consisting of food-grade acids and their salts, bacteriocins, spice extracts, plant extracts, nisin, hops acid extracts, tertiary butylhydroquinone, cetyl pyridium chloride, and mixtures thereof.

16. The method of claim 9, wherein the antimicrobial agent is selected from the group consisting of acetic acid, lactic acid, malic acid, phosphoric acid, sorbic acid, benzoic acid, and mixtures thereof.

17. The method of claim 9, wherein the antimicrobial agent is a hops acid extract.

18. The method of claim 9, wherein the antimicrobial agent comprises an antimicrobial composition which comprises a hop beta acid, a food grade organic acid, a soluble potassium ion source, and an antioxidant in a carrier solvent, wherein the carrier solvent comprises a food grade alcohol, a food grade glycol, or mixtures thereof.

19. The method of claim 8, wherein the plurality of wieners are separated from each other prior to thermal surface treatment.

20. The method of claim 18, wherein the plurality of wieners are and separated from each other prior to thermal surface treatment.

21. The method of claim 9, wherein the time for thermal surface treatment is about 1 to about 2 seconds.

22. The method of claim 20, wherein the time for thermal surface treatment is about 1 to about 2 seconds.

23. The method of claim 21, wherein the food product is maintained within an enclosed space between the introduction of the effective amount of an antimicrobial solution and vacuum sealing in order to minimize re-exposure to pathogenic contamination.

24. The method of claim 22, wherein the food product is maintained within an enclosed space between the introduction of the effective amount of an antimicrobial solution and vacuum sealing in order to minimize re-exposure to pathogenic contamination.

25. The method of claim 23, wherein the enclosed space is flushed with steam, sterile or treated air, or inert gas.

26. The method of claim 24, wherein the enclosed space is flushed with steam, sterile or treated air, or inert gas.

27. The method of claim 24, wherein sterilizing radiation is employed within the enclosed space.

28. The method of claim 25, wherein sterilizing radiation is employed within the enclosed space.

29. A method for controlling pathogenic contamination in a vacuum-sealed food product, said method comprising, in order, forming a lower web into a partial package at a forming station, loading the food product into the partially formed package at a loading station, thermal treatment of the surfaces of the food product in the partially formed package at a thermal surface treatment station, treatment of the surfaces of the food product in the partially formed package with a solution containing an antimicrobial agent at an antimicrobial application station, and sealing the treated food product in a closing station by forming a final package from the partially formed package and an upper web employing a vacuum heat sealing operation such that the final package shrinks around the food product and the antimicrobial solution is uniformity dispersed over the surfaces of the food product, and wherein the thermal treatment and the solution of the antimicrobial agent are, in combination, effective for killing or inactivating essentially all pathogenic contamination in the vacuum-sealed food product.

30. The method of claim 29, wherein the thermal treatment uses bursts of steam and wherein at least a portion of condensate formed during the thermal treatment is removed from the food product prior to treatment with the antimicrobial solution.

31. The method of claim 30, wherein a temperature senor is used to confirm proper thermal treatment of the food product and wherein if the temperature sensor determines that proper thermal treatment did not occur, the method is stopped until proper thermal treatment is restored.

32. The method of claim 31, wherein the antimicrobial application station comprises a first and second set of spray nozzles to apply the antimicrobial solution and a first and second sensor to confirm proper application of the antimicrobial solution from the first and second set of spray nozzles, respectively, wherein the second set of spray nozzles are employed only if the first sensor determines that the first set of spray nozzles did not provide proper application of the antimicrobial solution, and wherein, in the event the second set of spray nozzles are employed and the second sensor determines that the second set of spray nozzles also did not provide proper application of the antimicrobial solution, the method is stopped until proper application is restored.

* * * * *

UNITED STATES PATENT AND TRADEMARK OFFICE
CERTIFICATE OF CORRECTION

PATENT NO. : 7,247,330 B2
APPLICATION NO. : 10/378247
DATED : July 24, 2007
INVENTOR(S) : Kuethe et al.

Page 1 of 1

It is certified that error appears in the above-identified patent and that said Letters Patent is hereby corrected as shown below:

In column 25, line 11, claim 20, after "are" delete "and".

In column 26, line 20, claim 31, delete "senor" and insert -- sensor --.

Signed and Sealed this

Seventeenth Day of June, 2008

JON W. DUDAS
*Director of the United States Patent and Trademark Office*